(12) United States Patent
Bacus et al.

(10) Patent No.: US 9,411,901 B2
(45) Date of Patent: Aug. 9, 2016

(54) MANAGING SATELLITE AND AERIAL IMAGE DATA IN A COMPOSITE DOCUMENT

(75) Inventors: John M. Bacus, Boulder, CO (US); Paul McLean, Denver, CO (US); Jeff Hauswirth, Westminster, CO (US); Preston Jackson, Longmont, CO (US); Brian G. Brown, Longmont, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 168 days.

(21) Appl. No.: 13/172,602

(22) Filed: Jun. 29, 2011

(65) Prior Publication Data

US 2013/0002648 A1    Jan. 3, 2013

(51) Int. Cl.
*G06T 17/05* (2011.01)
*G06F 17/30* (2006.01)
*G06F 17/24* (2006.01)

(52) U.S. Cl.
CPC ........ *G06F 17/30893* (2013.01); *G06F 17/248* (2013.01); *G06T 17/05* (2013.01)

(58) Field of Classification Search
CPC ...................................................... G06T 17/05
USPC .......................................................... 345/629
See application file for complete search history.

(56) References Cited

U.S. PATENT DOCUMENTS

| | | | |
|---|---|---|---|
| 5,559,707 A * | 9/1996 | DeLorme et al. ............. 701/467 |
| 5,664,208 A | 9/1997 | Pavley et al. | |
| 5,675,788 A | 10/1997 | Husick et al. | |
| 5,818,724 A | 10/1998 | Brewster et al. | |
| 6,215,498 B1 * | 4/2001 | Filo et al. ...................... 345/419 |
| 6,336,074 B1 * | 1/2002 | Woo ............................... 701/431 |
| 6,363,404 B1 | 3/2002 | Dalal et al. | |
| 6,694,064 B1 * | 2/2004 | Benkelman ................... 382/284 |
| 7,054,701 B2 | 5/2006 | Shimizu et al. | |
| 7,263,667 B1 * | 8/2007 | Hoellerer ............... G01C 21/20 715/738 |
| 7,343,626 B1 | 3/2008 | Gallagher | |
| 7,415,356 B1 * | 8/2008 | Gowda et al. ..................... 702/5 |
| 7,801,721 B2 | 9/2010 | Rosart et al. | |
| 7,849,201 B1 | 12/2010 | Subbarao et al. | |
| 7,865,301 B2 | 1/2011 | Rasmussen et al. | |
| 7,873,697 B2 * | 1/2011 | Goldstein et al. ............. 709/207 |
| 7,920,963 B2 * | 4/2011 | Jouline et al. ................. 701/420 |
| 8,259,132 B2 * | 9/2012 | Buchheit ....................... 345/619 |
| 8,274,506 B1 * | 9/2012 | Rees ....................... G06T 15/04 345/419 |
| 8,290,943 B2 * | 10/2012 | Carbone et al. ............... 707/724 |
| 2002/0011941 A1 * | 1/2002 | Endo .................. G01C 21/3635 340/995.1 |

(Continued)

OTHER PUBLICATIONS

International Search Report and Written Opinion for Application No. PCT/US2012/044386, dated Jan. 25, 2013.

(Continued)

*Primary Examiner* — Jeffery A Brier
(74) *Attorney, Agent, or Firm* — Sheridan Ross P.C.

(57) ABSTRACT

A method in a computing device for generating a composite document includes receiving drawing data from a user interface, where the drawing data includes a plurality of two-dimensional shapes, and generating a first data structure that includes the received drawing data. The method further includes receiving a reference to a geographic location from the user interface and, in response to receiving the reference to the geographic location, retrieving photograph data corresponding to the received reference, where the photograph data includes at least one of satellite image data and aerial image data for the geographic location.

19 Claims, 16 Drawing Sheets

(56) References Cited

U.S. PATENT DOCUMENTS

| | | | |
|---|---|---|---|
| 2002/0047895 A1* | 4/2002 | Bernardo et al. ............... | 348/48 |
| 2002/0089499 A1 | 7/2002 | Lee et al. | |
| 2002/0158886 A1 | 10/2002 | Hallbauer et al. | |
| 2004/0039987 A1 | 2/2004 | Coppin et al. | |
| 2004/0176908 A1 | 9/2004 | Senda et al. | |
| 2004/0205554 A1 | 10/2004 | Goswami et al. | |
| 2005/0034062 A1* | 2/2005 | Bufkin et al. ................. | 715/512 |
| 2005/0083325 A1 | 4/2005 | Cho | |
| 2005/0086585 A1* | 4/2005 | Robert .................... | A63F 9/183 715/246 |
| 2005/0235031 A1 | 10/2005 | Schneider et al. | |
| 2005/0270311 A1* | 12/2005 | Rasmussen et al. .......... | 345/677 |
| 2006/0005114 A1 | 1/2006 | Williamson et al. | |
| 2006/0139375 A1* | 6/2006 | Rasmussen ............ | G01C 21/32 345/641 |
| 2006/0173657 A1 | 8/2006 | Haws et al. | |
| 2007/0038665 A1 | 2/2007 | Kwak et al. | |
| 2007/0088671 A1* | 4/2007 | McElroy et al. .................. | 707/1 |
| 2008/0221790 A1* | 9/2008 | Min et al. ...................... | 701/209 |
| 2008/0291205 A1 | 11/2008 | Rasmussen et al. | |
| 2009/0063948 A1 | 3/2009 | Finn et al. | |
| 2009/0100368 A1 | 4/2009 | Look et al. | |
| 2009/0106307 A1 | 4/2009 | Spivack | |
| 2010/0010697 A1 | 1/2010 | Soma et al. | |
| 2010/0201684 A1 | 8/2010 | Yadev et al. | |
| 2010/0298050 A1* | 11/2010 | Taraschuk et al. .............. | 463/31 |
| 2011/0022295 A1* | 1/2011 | Lee ................ | 701/200 |
| 2011/0055024 A1 | 3/2011 | Shen | |
| 2011/0064312 A1* | 3/2011 | Janky et al. .................... | 382/195 |
| 2011/0093197 A1 | 4/2011 | Bowman et al. | |
| 2012/0017148 A1 | 1/2012 | Watt et al. | |
| 2012/0038623 A1* | 2/2012 | Van Raamsdonk ........... | 345/419 |
| 2012/0044089 A1 | 2/2012 | Yarnold et al. | |
| 2012/0226688 A1 | 9/2012 | Reid et al. | |
| 2012/0317171 A1 | 12/2012 | Lu | |
| 2013/0002647 A1 | 1/2013 | Bacus et al. | |
| 2013/0007575 A1 | 1/2013 | Bacus et al. | |

OTHER PUBLICATIONS

U.S. Appl. No. 13/238,768, Hauswirth et al.
"AutoCad Basics: Dimensions and Dimension Styles in AutoCAD," available at http://comp3820.hubpages.com/hub/AutoCAD-Basics-Dimensions-and-Dimension-Styles-in-AutoCAD-tutorial, Jul. 23, 2009, 3 pages.
"Google LayOut 2 Help," Google, 2008, 323 pages.
"SketchUp User's Guide," Google, 2006, 370 pages.
International Search Report and Written Opinion for International Patent Application No. PCT/US2012/044396, dated Dec. 28, 2012, 7 pages.
International Preliminary Report on Patentability for International Patent Application No. PCT/US2012/044396, dated Jan. 7, 2014, 5 pages.
International Preliminary Report on Patentability for International Patent Application No. PCT/US2012/044386, dated Jan. 7, 204, 5 pages.
Official Action for U.S. Appl. No. 13/238,768, mailed May 8, 2013, 17 pages.
Final Action for U.S. Appl. No. 13/238,768, mailed Oct. 8, 2013, 15 pages.
Official Action for U.S. Appl. No. 13/238,768, mailed Feb. 24, 2014, 18 pages.
Official Action for U.S. Appl. No. 13/172,591, mailed May 21, 2013, 41 pages.
Final Action for U.S. Appl. No. 13/172,591, mailed Oct. 10, 2013, 39 pages.
Chopra "Google SketchUp for Dummies," Wiley Publishing Inc., 2007, pp. 20-25, 76, 167-179, 274-290 and 351-378.
Notice of Allowance for U.S. Appl. No. 13/172,580, mailed Mar. 2, 2015 12 pages.
Official Action for U.S. Appl. No. 13/172,591, mailed Jan. 5, 2015 35 pages.
"How It Works," Quark Publishing System, retrieved Jan. 4, 2011 from http://www.quark.com/Product/Quark_Publishing_System/How_it_works, 2 pages.
"Preview web pages across multiple borsers and operating systems," Cross-brower testing service, web diagnostic tools, Adobe Browser, retrieved Jan. 4, 2011 from https://browserlab.adobe.com/en-us/features.html, 4 pages.
"Technical Overview," Quark Publishing System, Quark Publishing System, 2010, retrieved on Jan. 4, 2011 from http://www.quark.com/Products/Quark_Publishing_System/Techical_Overview, 1 page.
Final Action for U.S. Appl. No. 13/172,580, mailed Dec. 12, 2014 17 pages.
Notice of Allowance for U.S. Appl. No. 13/238,768, mailed Jul. 29, 2014, 7 pages.
Heitzman "SketchUp Instructions," Triton College, Nov. 6, 2010, pp. 1-25.
Adobe Creative Team. Adobe Acrobat 9: Classroom in a Book. Berkeley, Calif: Peachpit, 2009.
Ahmed "Display Live Web Pages in PowerPoint Presentation Slides," Oxhow. Published Mar. 29, 2011. Web. Accessed May 12, 2014.
Byrnes, David. AutoCAD 2010 for Dummies. Hoboken, NJ; Wiley Publishing, Inc. 2009.
Parker, Roger. Microsoft Office 4 for Windows for Dummies. Foster City, Calif: IDG Books Worldwide, inc., 1994.
International Search Report and Written Opinion for Application No. PCT/US2012/044401, dated Jan. 3, 2013.
International Preliminary Report on Patentability for International (PCT) Patent Application No. PCT/US2012/044401, mailed Jan. 16, 2014 6 pages.
Official Action for U.S. Appl. No. 13/172,580, mailed May 29, 2014 27 pages.
Official Action for U.S. Appl. No. 13/172,591, mailed Apr. 30, 2014 33 pages.

* cited by examiner

MANAGING SATELLITE AND AERIAL IMAGE DATA IN A COMPOSITE DOCUMENT

FIELD OF TECHNOLOGY

This disclosure generally relates to generating and managing a composite document and, in particular, to generating and managing a composite document that includes satellite and aerial image data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computer-generated presentations are widely used in business, academic, scientific, and other environments. Typically, a computer-generated presentation is made up of multiple slides having text and, in some cases, images in a digital image file format such as BMP, JPEG, etc. For example, a user may illustrate the presentation by inserting drawings or photographs into the corresponding slides. Generally, during a presentation, the user sequentially shows the slides to an audience.

SUMMARY

In an embodiment, a method in a computing device for generating a composite document includes receiving drawing data from a user interface, where the drawing data includes a plurality of two-dimensional shapes, and generating a first composite document entity, where the first composite document entity is a data structure that includes the received drawing data. The method further includes receiving a reference to a geographic location from the user interface, in response to receiving the reference to the geographic location, retrieving photograph data corresponding to the received reference, where the photograph data includes at least one of satellite image data and aerial image data for the geographic location, generating a second document entity, where the second composite document entity is a data structure that includes the photograph data and the reference to the geographic location, and generating the composite document, where the composite document includes the first composite document entity and the second composite document entity.

In another embodiment, a tangible non-transitory computer-readable medium stores instructions thereon to implement a composite document system. When executed on a processor, the instructions cause the processor to receive model data that describes a three-dimensional model of an object, where the model data conforms to a non-image format and generate a first composite document entity that includes the model data. The instructions further cause the processor to receive a reference to a geographic location from a user interface, receive photograph data that corresponds to the received reference, where the photograph data includes at least one of satellite image data and aerial image data of the geographic location, generate a second composite document entity that includes the photograph data and the reference to the geographic location, and generate a composite document that includes the first composite document entity and the second composite document entity.

In another embodiment, a tangible non-transitory computer-readable medium stores instructions thereon to implement a composite document system. When executed on a processor, the instructions cause the processor to receive model data that describes a three-dimensional model of an object according to a non-image format, generate a first composite document entity, such that the first composite document entity is a data structure that includes the model data, and generate an interactive visual representation of the three-dimensional model to be displayed on a user interface, where the visual representation of the three-dimensional model is rotated in response to a command received via the user interface. The instructions further cause the processor to receive a reference to a geographic location, receive photograph data that corresponds to the received reference, where the photograph data includes at least one of satellite image data and aerial image data of the geographic location, generate a second composite document entity, where the second composite document entity includes the photograph data and the reference to the geographic location, and generate an interactive visual representation of the photograph data to be displayed on a user interface, such that a zoom level to which the photograph data corresponds is adjusted in response to a command received via the user interface. The instructions further cause the processor to generate a composite document that includes the first composite document entity and the second composite document entity and cause the composite document to be displayed on the user interface as a set of presentation slides, where the set of presentation slides includes the interactive visual representation of the three-dimensional model and the interactive visual representation of the photograph data.

DETAILED DESCRIPTION

Figure 1:
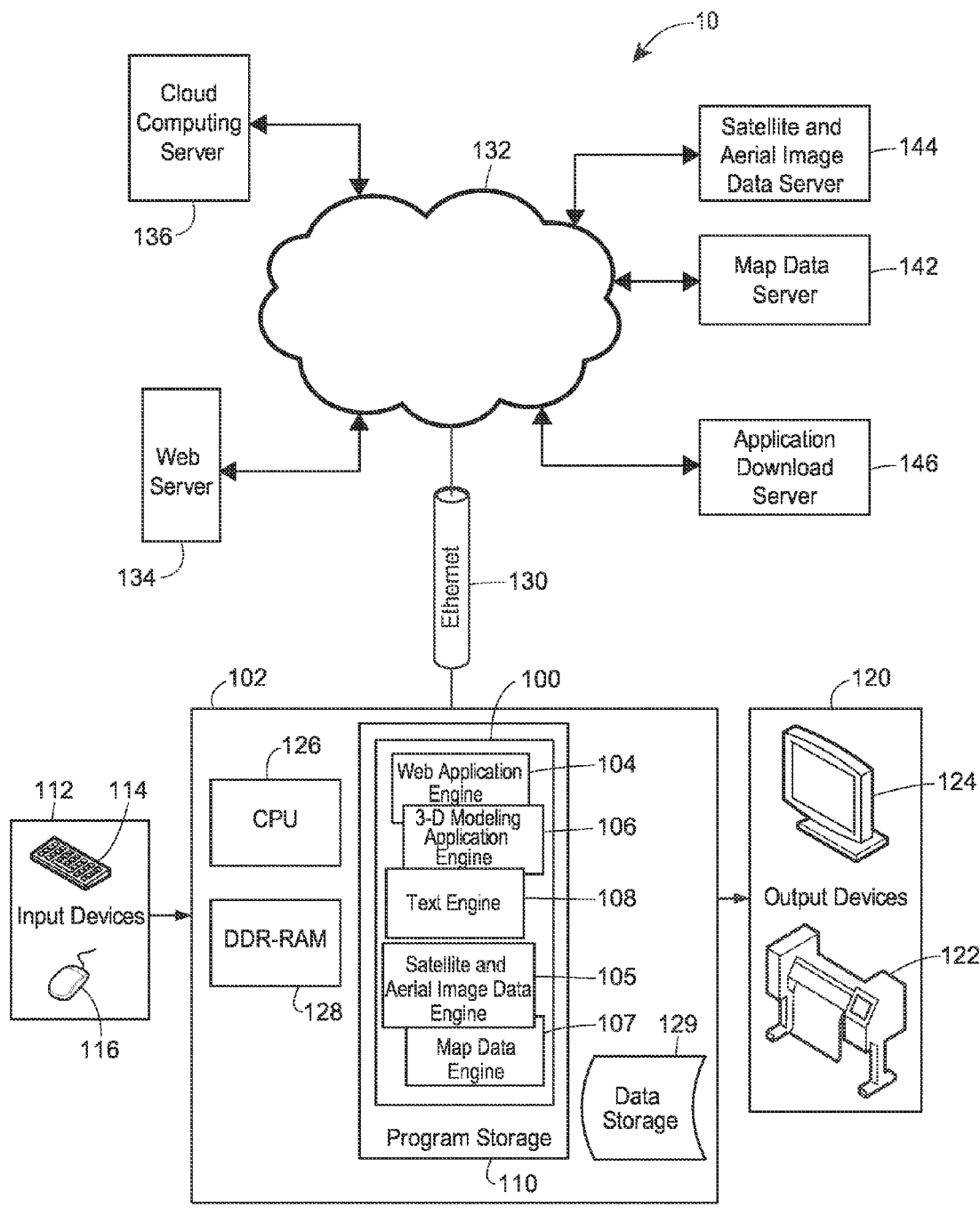
FIG. 1 is a block diagram of a computing environment in which a system for generating and managing composite documents ("the composite document system") operates, according to an embodiment.

Generally speaking, a system for creating and managing composite documents ("the composite document system") allows a user to efficiently generate a composite document that includes several types of data, such as text, images, video and/or audio content, web page data, map data, satellite and aerial data. The composite document system further allows the user to edit a previously created composite document, update the composite document with new data of one or more types, and adjust visual characteristics of the data included in the composite document. In an embodiment, the composite document system is integrated with a modeling software for creating three-dimensional (3D) models of objects such as buildings, vehicles, furniture, etc., so that a 3D model developed using the modeling software can be added to a composite document as model data that conforms to a non-image format of the modeling software. A user can manipulate (e.g., rotate, scale, spin about a certain point or "orbit") the 3D model in the composite document system without launching the modeling software as a separate application or generating an instance of the modeling software within a window embedded in the composite document system, for example. Further, in an embodiment, the composite document system provides a set of controls on a user interface for drawing two-dimensional (2D) shapes. A user may use a composite document system that implements some or all of the techniques of the present disclosure to create an interactive presentation made up of a series of presentation slides, for example.

In at least some of the embodiments discussed herein, composite documents include multiple data objects (or "entities") that are rendered in corresponding containers. An entity may include an indication of the type of data (e.g., text, an image, a 2D drawing shape, a 3D model, web page data, map data, satellite and aerial image data), the geometry (e.g., positioning, orientation) of the visual representation of the data in the composite document, and a reference to the source of the data (such as a URL referring to the web page from which web page data was received, for example). Thus, for example, a certain composite document may contain a model entity that includes a 3D model of a building and positioning data that indicates where a container for the model is located when the composite document is displayed on a user interface, as well as a text entity that includes a text describing the model and the corresponding positioning data.

According to some embodiments, a user can interact with and modify data within containers by invoking functionality resident in the composite document system. For example, in an embodiment, the composite document system receives and stores web page data, including content and a description of the content in a mark-up language, from a host disposed on the Internet. The user then spatially locates a container for the web page data within a composite document, and the composite document system interprets the web page data and generates an appropriate visual representation (or simply "image") of the web page data. Further, in some embodiments, the visual representation of the web page data is interactive, and the user may activate links included in the web page data, click on buttons, launch playback of audio and video content, and otherwise interact with the web page data. To this end, the composite document system may include a set of application programming interface (API) functions of an embedded browser, such as Cocoa NSWebView used on a Mac OS platform or the WebBrowser class used on a Windows platform, for example.

Further, for at least some types of data, the composite document system provides a set of interactive tools that allow a user to specify sources of data to be used in various entities (e.g., URLs of web pages, references to geographic locations for which map data or satellite and aerial imagery is obtained, references to 3D models), inspect entities, edit entities, activate functions within certain entities (e.g., activate a Flash animation in web page data), update entities with up-to-date information (e.g., retrieve updated web page data, a new traffic map, or an updated 3D model), reposition or re-orient containers that enclose entity data, etc. Some of these interactive tools may operate on only some of the types of entities, while other tools may operate on entities of all types. Further, some of the tools may be made available to a user in accordance with the current mode of operation (e.g., edit, presentation).

Several example systems and methods for generating and managing composite documents that include one or more of web page data, map data, and satellite image data are discussed below. First, a brief overview of an example composite document system and an environment in which the composite document system may operate is discussed with reference to FIGS. 1 and 2. Several techniques for including web page data in a composite document are then discussed with reference to FIGS. 3-10, followed by a discussion of several techniques for including satellite and aerial image data with reference to FIGS. 11-15, further followed by a discussion of several techniques for including map data in a composite document with reference to FIGS. 16-19.

System Overview

FIG. 1 is a block diagram of a computing environment 10 in which an example composite document system 100 may operate to allow users to dynamically select and include data of different types in composite documents. In the embodiment of FIG. 1, the composite document creation system 100 operates in a computing device 102 and includes a web application engine 104, a 3D modeling application engine 106, a satellite and aerial data engine 105, a map data engine 107, and a text application engine 108 stored as computer-readable instructions on a tangible, non-transitory storage medium (or "program storage") 110. However, in other embodiments, the composite document creation system 100 includes only some of the components 104-108. For example, in one embodiment, the composite document creation system 100 includes the 3D modeling application engine 106 and the web application engine 104, but does not include the satellite and aerial data engine 105 or the map data engine 107. In another embodiment, the composite document system 100 includes the 3D modeling application engine 106 and the satellite and aerial data engine 105, but does not include the web application engine 104 or the map data engine 107. In yet another embodiment, the composite document creation system 100 includes the 3D modeling application engine 106 and the map data engine 107, but does not include the web application engine 104 or the satellite and aerial data engine 105. In general, the composite document creation system 10 may include any suitable combination of the components 104-108.

In operation, the composite document creation system 100 receives input from an input sub-system 112 communicatively coupled to the computing device 102. The input sub-system 112 generally may include one or more of a pointing device such as a mouse, a keyboard, a touch screen, a trackball device, a digitizing tablet, a microphone, etc. In the embodiment of FIG. 1, the input sub-system 112 includes a mouse 116 and a keyboard 114. Further, the composite document creation system 100 provides output, such as a visual representation of a composite document, prompts and dialogs, etc., to an output sub-system 120 that is also communicatively coupled to the computing device 102. In an embodiment, the output sub-system 120 includes an LCD display monitor 124 and a plotter 122, although in other embodiments, the output sub-system 120 additionally or alternatively includes one or more of a touch screen, printer, a speaker, etc. In some embodiment, the computing device 102 includes one or both of the input sub-system 112 and the output system 120. As discussed in more detail below, the composite document creation system 100 provides a graphical user interface (GUI) to a user via the input sub-system 112 and the output sub-system 120.

With continued reference to FIG. 1, the computing device 102 may include a central processing unit (CPU) 126, a program memory 128, and a data storage 129. Depending on the embodiment, the program memory 128 may be a Dual Data Rate Dynamic Random Access Memory (DDR-DRAM), as illustrated in FIG. 1, a Static Random Access Memory (SRAM), or any other suitable type of a non-persistent high-speed memory. The program memory 128 may be provided on the same chip as the CPU 126 or on a separate chip. The data storage 129 may be a hard disk drive (HDD) that communicates with the CPU 126 over a bus, for example, or another type of a suitable persistent storage device. In operation, the CPU 126 retrieves the computer instructions that make up the engines 104-108 from the data storage 129 and executes the instructions to provide the functionality of the engines 104-108.

The composite document system 100 may include one or several network cards (not shown) and communicate with remote hosts disposed on a network 132 (e.g., the Internet) via a communication link 130 (e.g., an Ethernet link) For example, the web application engine 104 may receive web page data from a source web page provided by a web server 134, the map data engine 107 may receive map data from a map data server 142, and the satellite and aerial data engine 105 may receive satellite and aerial data from a satellite and aerial data server 144. In another embodiment, the map data server 142 and the satellite and aerial data server 144 operate on a same host. Further, in an embodiment, some or all of the engines 104-108 can be downloaded to the computing device 102 from an application download server 146.

In the embodiment of FIG. 1, the computing device 102 is a personal computer (PC). However, in other embodiments, the computing device 102 may be any suitable stationary or portable computing device such as a tablet PC, a smartphone, etc. Further, although the computing device 102 in the example embodiment of FIG. 1 includes both storage and processing components that can fully support the composite document system 100, the computing device 102 in other embodiments can be a so-called thin client that depends on another computing device for certain computing and/or storage functions. For example, in one such embodiment, the data storage 129 and the program storage 110 are external to the computing device 102 and are connected to the computing device 102 via the Ethernet link 130.

Figure 2:
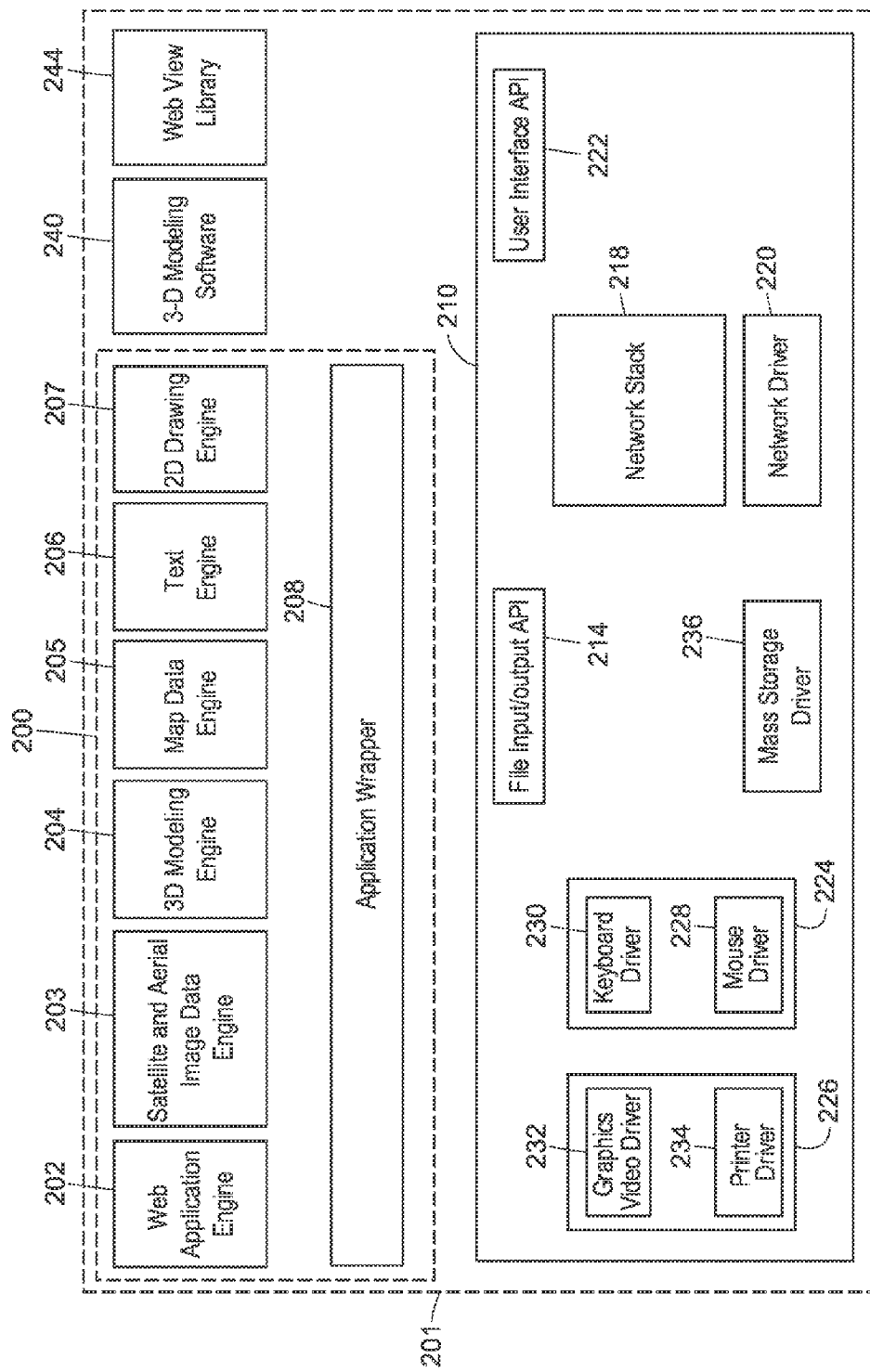
FIG. 2 a block diagram of an example composite document system that may operate in the computing environment of FIG. 1.

Now referring to FIG. 2, the composite document system 100 of FIG. 1 may be implemented, for example, as a composite document system 200 that executes in a software environment 201. In an embodiment, a web application engine 202, a satellite and aerial data engine 203, a 3D modeling engine 204, a map data engine 205, a text engine 206, and a 2D drawing engine 207 are software modules that interface with an application framework or wrapper 208 of the document system 200. The engines 202-206 may be similar to the respective ones of the engines 104-108 of FIG. 1. Further, depending on the embodiment, the composite document system 200 may include additional components such as an image rendering engine (not shown) to render data that conforms to a standard image format such as BMP, JPEG, GIF, etc. Conversely, in some embodiments, the composite document system 200 may include only some of the engines 202-207. The application wrapper 208 may operate as a "glue" layer and provide APIs, variables, message queues, etc. using which the engines 202-207 and possibly other components of the composite document system 200 may interact with each other. The application wrapper 208 may in turn interface with an operating system (OS) 210 such as Android, Linux, Windows, Mac OS, etc. In another embodiment, the composite document system 200 executes on a Java Virtual Machine (JVM) in a Java environment, and the application wrapper 208 includes functions that are platform-agnostic, i.e., independent of the operating system and the hardware on which the operating system executes. In yet another embodiment, some or all of the components of the composite document system 200 are implemented in a scripting language interpreted by a browser, for example.

In operation, the OS 210 allows the engines 202-207 to receive input data from input devices and provide output to output devices, such as devices operating in the input sub-system 112 and the output sub-system 120 of FIG. 1, respectively. In particular, the OS 210 may include one or several user interface APIs 222 to access input and output devices, input device drivers 224, such as a mouse driver 228 and keyboard driver 230, as well as output device drivers 226, such as a graphic video driver 232 and a printer driver 234, for example. Further, some or all of the engines 202-206 may programmatically interface with a network stack 218. Referring back to FIG. 1, in an embodiment, the network stack 218 enables tasks executing in the software environment 201 to communicate with remote hosts such as servers 134, 136, 142, 144 and 146. For example, the network stack 218 may implement the TCP/IP protocol and interface with a network driver 220 that controls a network card, via which tasks in the software environment 201 can send and receive data.

The text engine 206 may process text input received from an input device or another document, for example. In an embodiment, the text engine 206 supports styled text editing (e.g., Rich Text Format or "RTF") that allows users to apply to the text various fonts, font faces (e.g., bold, italic, light, heavy), styles, paragraph formatting (e.g., left-align, right-align), tabs, tabular layout, bulleted and/or number lists, etc In an embodiment, a 3D modeling software 240 for developing 3D models of various objects operates in the software environment 201. The 3D modeling software 240 generally provides a set of modeling controls to generate, position, and variously adjust three-dimensional shapes, apply textures to the shapes or surfaces, define interactions between shapes, etc. Models developed using the 3D modeling software 240 may be stored on a computer-readable medium as data files that conform to a certain non-image format. For example, the non-image format may specify a set of faces of a 3D models along with the corresponding attributes, such as the position and orientation of a face, the texture of the face, etc. According to an embodiment, the 3D modeling engine 204 is configured to render a 3D model developed using the 3D modeling software 240 and stored in the non-image format of the 3D modeling software 240. Further, in some embodiments, the 3D modeling engine 204 is configured to enable additional interaction with the 3D model within a corresponding container included in a composite document. The 3D modeling engine 204 may allow a user to rotate, scale, and otherwise select and adjust the manner in which the 3D model is rendered, for example. Still further, in some embodiments, the 3D modeling engine 204 may provide at least partial editing functionality for a 3D model included in the composite document. In one such embodiment, the 3D modeling engine 204 is a shared software component, such as a Dynamic-link Library (DLL) that includes a set of functions which both the composite document system 200 and the 3D modeling software 240 access during operation.

With continued reference to FIG. 2, the composite document system 200 may also interface with DLLs or other function libraries that provide additional functionality to one or more software applications operating in the software environment 201. For example, in an embodiment, a web view library 242 provides embedded browser functionality. The web view library 242 may include, for example, functions for generating and processing data packets that conform to the Hypertext Transfer Protocol (HTTP), encode data according to the Secure Socket Layer (SSL) protocol, request and verify digital certificates, etc.

Further, in some embodiments, the composite document system 200 may interact with one or more plugin components (not shown) that variously extend the functionality of an embedded browser operating in the composite document system 200. For example, a Flash plugin may be installed in the software environment 201 as a DLL to support playback of Flash-based content, a plugin for interacting with street-level photographs and videos provided by a corresponding service may be installed in the software environment 201 as another DLL, etc.

As discussed in more detail below, the web application engine 202 receives web page data from a remote host such as the web server 134 illustrated in FIG. 1. Web page data may include content, such as text, images, animations, video files, audio files, etc. as well as instructions in a mark-up language such as HTML. The web application engine 202 may also automatically retrieve content referenced in the web page data using URLs, for example. In an embodiment, the web application engine 202 is configured to interpret the content of web page data according to the mark-up language and generate a visual representation of the interpreted content in a corresponding container. In some embodiments, the web application engine 202 may include or invoke the functionality of the web view library 242 to provide an embedded browser within the corresponding container. A user may accordingly view the web data and interact with the web data in at least a limited manner (e.g., activate Flash content included in the web page data, scroll through the content of the web page data, activate "forward" and "back" controls to retrieve the corresponding data, when available).

The map data engine 205 provides user interface controls for a user to specify a geographic location and, upon receiving location data from the user interface, receives map and related cartographic data from a remote host such as the map data server 142 illustrated in FIG. 1, according to an embodiment. The map data engine 205 may invoke appropriate APIs provided by the wrapper 208 to interface with the network stack 218 and/or APIs provided by a map data service. For example, an API may cause a request for map data corresponding to a particular type (e.g., terrain) for a particular location to be transmitted to a map data server and, when the map data is received, render the map data within the corresponding container.

Further, in an embodiment, the satellite and aerial data engine 203 receives a selection of a geographic location from a user interface and retrieves satellite and aerial data corresponding to the selected geographic location. Similar to the map data engine 205, the satellite and aerial data engine 203 may invoke APIs provided by a satellite and aerial data service. In an embodiment, the satellite and aerial data service is provided by a satellite and aerial image data server such as the server 144 of FIG. 1, for example.

In an embodiment, some or all of the engines 202-207 communicate with a mass storage driver 236 to store and retrieve composite documents from a persistent memory such as the data storage 129 of FIG. 1, for example. In an embodiment, the web application engine 202 stores web page data as well as objects embedded in the web page data and/or referenced by the web page data. In general, a composite document generated by the composite document system 200 may be stored in any suitable format such as extensible markup language (XML), for example. According to some embodiments or scenarios, a composite document is stored as several data files (e.g., an XML file, one or several audio file, one or several 3D model files, etc.).

A composite document may be stored with a static snapshot of dynamic data included in the composite document, according to some embodiments. For example, a composite document may include the content of a certain web page as well as the images referenced in the content. As another example, a composite document may store both a 3D model in a non-image format of the 3D modeling software 240 and a snapshot of the 3D model in a standard digital image format.

Generally speaking, a user may utilize the composite document system 100 or 200 to create an interactive presentation made up of a series of presentation slides, edit a previously created presentation, and display the presentation slides to an audience. The interactive presentation may include data of only one type or, in some cases, no data at all. In some embodiments, the interactive presentation may include two or more of a 3D model, 2D shapes, text, images in a digital image format, web page data, map data, satellite and aerial image data, etc., each of which may be stored in a respective entity and rendered in a respective container. In some embodiments, the composite document system 100 or 200 operates in several modes, such as an edit mode and a presentation mode, and in different modes provides different functionality and different sets of user controls to a user. For example, a user may be able to rotate a 3D model included in a composite document both in the edit mode and in the presentation mode, but resizing the container that includes the 3D model may be available only in the edit mode.

Next, several features that may be provided by the web application engine 202, the satellite and aerial data engine 203, and the map data engine 205 are discussed in the respective sections below.

Web Application Engine

Figure 3:
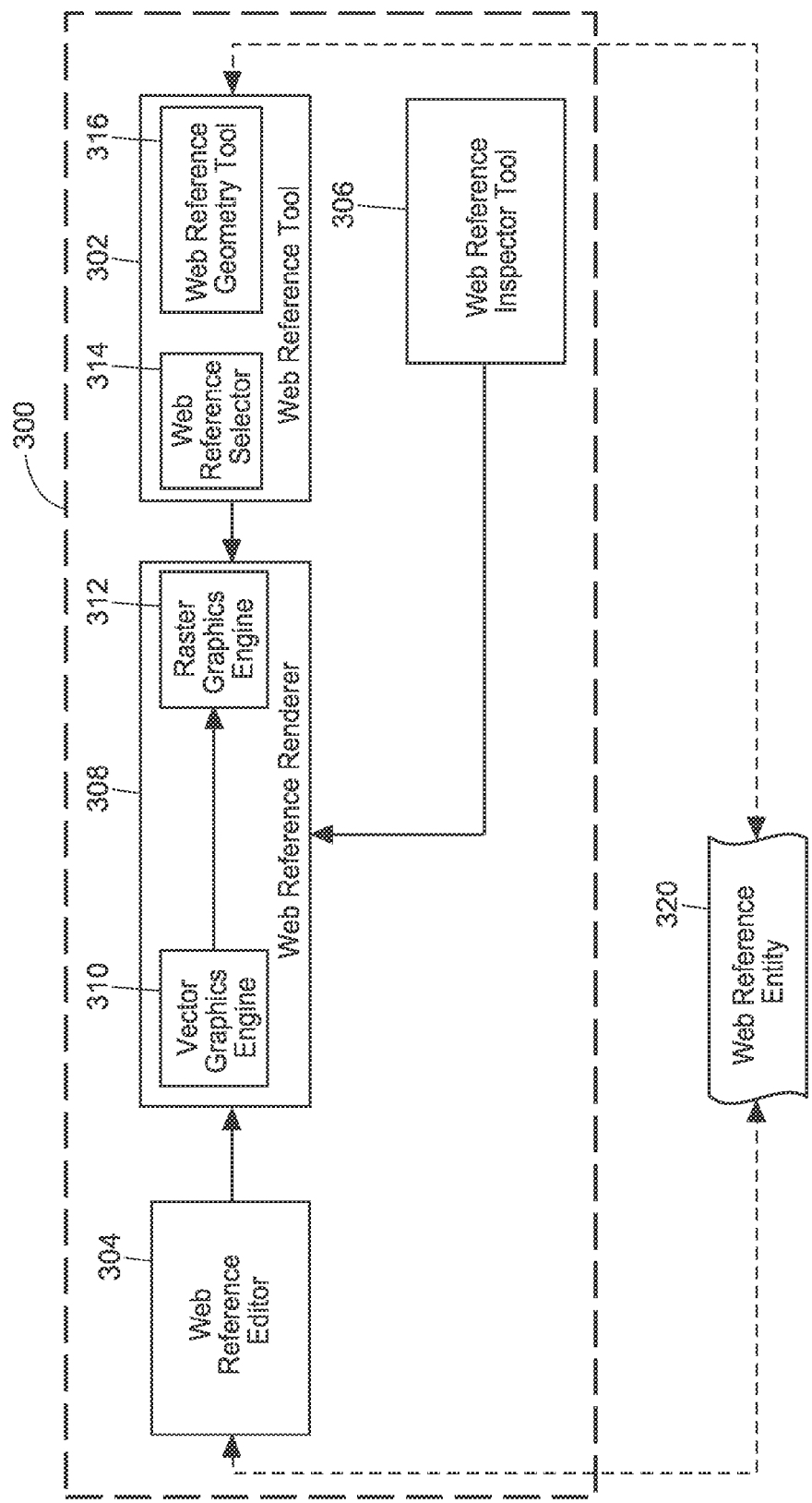
FIG. 3 is a block diagram of an example web application engine that may be used in the composite document system of FIG. 2.

FIG. 3 is a block diagram of an example web application engine 300 that may be implemented as a set of computer-executable instructions and operate in a composite document system, such as the composite document system 100 or 200. Referring back to FIG. 2, the web application engine 300 may operate in the composite document system 200 as the web application engine 202 or a component of the web application engine 202, for example. The web application engine 300 may be configured to receive a reference to a source web page or a file containing web page data, receive web page data from the source web page or file, generate a web reference entity, store the web reference entity and/or the web page data in a computer-readable memory, provide users controls for editing the web page data, update the web page data, generate a visual representation of the web page data, enclose and render the web page data in a corresponding container included in a composite document, etc. In the embodiment of FIG. 3, the web application engine 300 includes a web reference tool 302, a web reference editor 304, a web reference inspector tool 306, and a web reference renderer 308. A user may be able to access some of the tools 302, 304, and 306 only in certain operation modes, according to an embodiment. In another embodiment, the tools 302, 304, and 306 may provide only partial functionality to a user in certain modes of operation.

As illustrated in FIG. 3, the web reference tool 302 may include a web reference selector tool 314 and a web reference geometry tool 316. During operation, the web reference selector tool 314 may receive a URL of a source web page (or another reference to web page data) from a user interface and receive web page data in accordance with the URL. The web reference geometry tool 316 may locate the received web page data within a container in a composite document and receive an initial geometry (e.g., positioning, orientation, size) of the container. The container may appear, for example, as a rectangle in which an embedded browser is displayed. In some scenarios, the URL of the source web page indicates a resource at a remote web server, while in other scenarios, the URL indicates a file stored in a local file system. In the edit mode, the web reference tool 302 may receive a URL from the user interface, follow the links embedded in the web page corresponding to the URL (when possible), and render web page content, possibly including dynamic media content such as animation, audio, video, etc.

The web application engine 300 may generate a web reference entity 320 as a data structure (or "object") that includes the web page data as well as the URL of the source web page from which the web page data was retrieved. The web reference entity 320 may also include data objects referenced by the web page data, such as images, videos, tabular data, etc. In an embodiment, the web reference entity 320 also includes a static snapshot of the web page data, e.g., the content of a web page, the description of the content in a mark-up language, and the images referenced in the content. Additionally or alternatively, the static snapshot of the web page includes an image of the web page data in a digital image format, for example. The web reference entity 320 may be stored in a memory such as the data storage 129 (see FIG. 1), for example.

The web reference editor 304 may provide an interface for an embedded web browser, so that a user can interact with the web page data received by the web reference tool 302 via a set of controls similar to those provided by a typical browser application (e.g., "back" and "forward" browser buttons and a "refresh" button). In an embodiment, the web reference editor 304 also allows the user to edit the URL of the web page data as well as the content in the web page data. Referring back to FIG. 2, the web reference editor 304 may interact with the web view library 242 or similar functions. When activated in the presentation mode, the web reference editor 304 may allow the user to manipulate the web page data and view dynamic media content such as animation, audio, video, etc. An example interface which the web reference editor 304 may provide, and the related functionality of the web reference editor 304, are discussed in more detail with reference to FIG. 8.

In an embodiment, the web application engine 300 automatically determines whether a new version of web page data is available at a host from which the web page was retrieved, according to an embodiment. The web application engine 300 accordingly may notify the user via an appropriate dialog box or automatically retrieve the new version of the web page data, depending on the embodiment or configuration.

With continued reference to FIG. 3, the web reference renderer 308 includes a vector graphics engine 310 and a raster graphics engine 312, according to an embodiment. When the web reference tool 302 receives a command to adjust one or more characteristics of the visual representation of the web page data, such as a command to zoom in or out, rotate the container that includes the visual representation of the web page data, or move the container to a new location, the vector graphics engine 310 may re-render the web page data in accordance with the received command to generate an updated visual representation of the web page data. Further, the web reference tool 302 may appropriately scale the updated visual representation to the size of the web page data container in the composite document. The raster graphics engine 312 may convert the output of the vector graphics engine 310 to a bit-map image sized to the container of the web page data and display the bit map image in the composite document.

Figure 4:
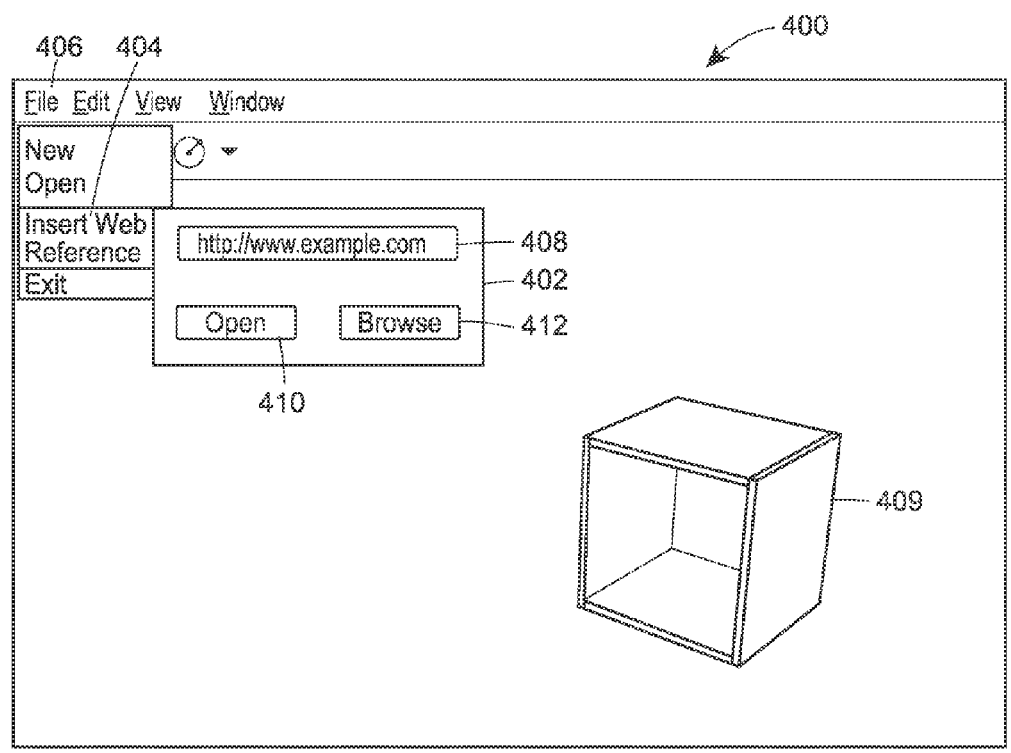
FIG. 4 is an example screenshot of a user interface window which the web application engine of FIG. 3 may generate to receive a reference to web page data.

FIG. 4 is an example screenshot of a user interface window 400 which the web reference selector tool 314 of FIG. 3 generates so that a user may enter a reference to web page data. In an embodiment, the web reference selector tool 314 causes a dialog box 402 to be displayed at an output device in response to receiving an indication that the Insert command 404 has been selected in the File menu 406. According to an embodiment, the web reference selector tool 314 is available in the edit mode when a composite document is being developed, and is not available in the presentation mode. The composite document in the example of FIG. 4 also includes a 3D model entity that contains model data, rendered in the user interface window 400 as a 3D model 409.

The web reference selector tool 314 may receive the URL of a remote web page (or another resource identifier) via an input text box 408 in any suitable manner (from a keyboard, from the OS clipboard, etc.). In response to detecting that an open button 410 has been activated, the web reference selector tool 314 may parse the URL received via the text box 408 and initiate the retrieval of web page data from the corresponding web page. The dialog box 402 may also include a browse button 412, so that a user may invoke a local file browser and a select web page data from a local resource, e.g., a file located in the file system of a computing device in which the web application engine 300 operates. Further, in an embodiment, the selector tool 314 verifies the received data to determine whether the received data conforms to a recognized format of web page data, such as HTML.

In an embodiment, the web reference selector tool 314 displays the dialog box 402 or a similar dialog box upon determining that certain text in an OS clipboard includes a URL. The web application engine 300 may prompt the user to determine whether the identified text should be interpreted as a URL and a web reference entity should be created with web page data corresponding to the URL. For example, when a user wishes to transfer text from a text editing software to a document composite system in which the web reference selector tool 314 operates, the text editing software may place the text into the OS clipboard, and the web reference selector tool 314, in response to the user pasting the text from the OS clipboard into a composite document, may automatically generate a text entity to contain the text. However, when the text includes a string of characters that parse into a URL, the composite document system may suggest to the user that a web reference entity be generated in addition to, or instead of, the text entity. The composite document system may further suggest to the user that web page data be retrieved from the URL detected in the pasted text.

Figure 5:
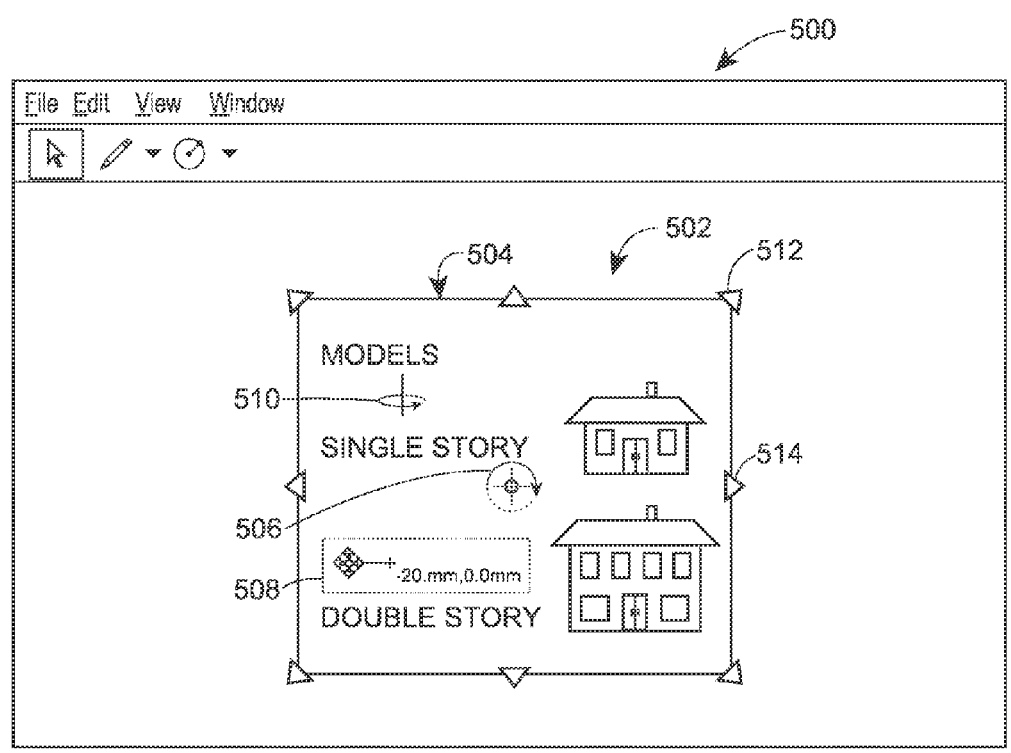
FIG. 5 is an example screenshot of a user interface window which the web application engine of FIG. 3 may generate to receive positioning data for web page data.

FIG. 5 is an example screenshot of a user interface window 500 which the web reference geometry tool 316 of FIG. 3 may generate to receive positioning and geometry data from a user interface and position a container 504 within a composite document 502. The container 504 encloses an image that corresponds to a visual representation of web page data. In the example embodiment of FIG. 5, the web reference geometry tool 316 implements a rotate tool 506, a move tool 508, and a tilt tool 510 to allow the user to rotate the container 504 or the image enclosed within the container 504, move the container 504 to a new location within the composite document 50, and tilt the container 504 or the image enclosed within the container 504, respectively. The web reference geometry tool 316 may modify the size and shape of the container 504 in response to a user actuating proportional dimension controls 512 or horizontal/vertical dimension controls 514 using a pointing device, for example.

Figure 6:
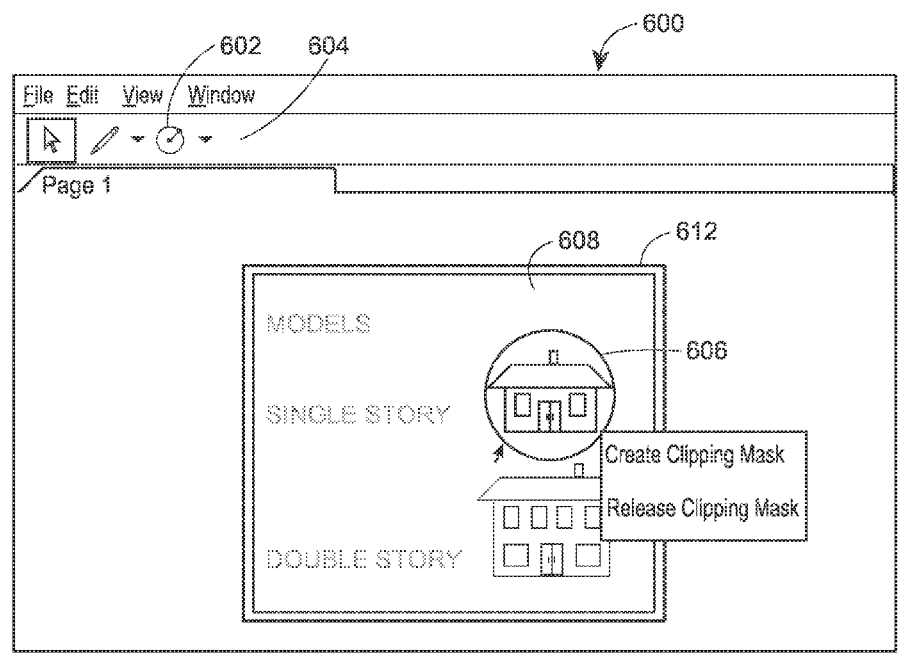
FIG. 6 is an example screenshot of a user interface window which the web application engine of FIG. 3 may generate to receive a clipping mask for web page data.

Referring to FIG. 6, the web reference editor 304 of FIG. 3 or a similar component may generate a user interface window 600 to allow a user to clip an image corresponding to received web page data. For example, a user may utilize a shape tool 602, provided as a component of the geometry tool 316 and accessible via a menu bar 604, to define a desired shape, which may be regular or irregular, for the image or a certain section of the image. In the example of FIG. 6, a user defines a circular clipping mask 606 for the image corresponding to web page data 608 using commands provided in a pull-down menu 612. In an embodiment, web application engine 300 stores the definition of the clipping mask 606 as a part of the web reference entity corresponding to the web page data 608.

Figure 7:
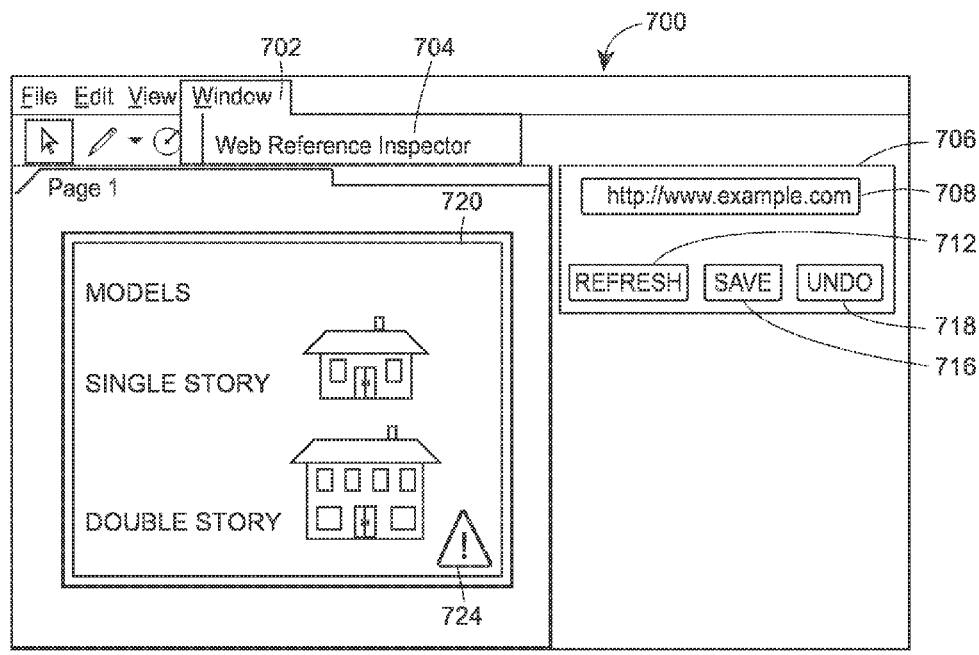
FIG. 7 is an example screenshot of a user interface window which the web application engine of FIG. 3 may generate to allow a user to inspect web page data included in a composite document.

FIG. 7 is an example screenshot of a user interface window 700 which the web application engine 300 may generate when a new version of web page data is available at a source (e.g., a host on the Internet) from which the currently available version of the web page has been retrieved, according to an embodiment. The web application engine 300 may activate the web reference inspector tool 306 when a user selects the Web Reference Inspector 704 menu option from a menu bar 702 or automatically upon entering the edit mode, for example. In an embodiment, the web reference inspector tool 316 receives user input from an inspector dialog 706 that may include a text box 708, a refresh button 712, a save button 716, and an undo button 718. As indicated above, a web reference entity may include the URL of the source web page data along with the corresponding web page data, and the inspector tool 316 may automatically display the URL of the source web page as pre-filled text in the text box 708. The user may update the URL as necessary, request that the web application engine 300 retrieve a new version of the web page data by clicking on the refresh button 712 and request that the web application engine 300 save new version of the web page data in the web reference entity by clicking on the save button 716. The inspector dialog 706 may be dockable and modeless, i.e., non-blocking with respect to other windows, dialogs, containers, and tools. Further, in some embodiments, the inspector dialog 706 also includes "back," "forward," and other browser buttons or controls.

As further illustrated in FIG. 7, the user interface window 700 may render the currently available web page data in a container 720. In an embodiment, the web application engine 300 receives a new version of web page data, compares the newly received web page data with the current version of the web page data in the corresponding web reference entity and, if the newly received web page data is different from the current version of the web page data, the web application engine 300 generates a notification icon 724.

Figure 8:
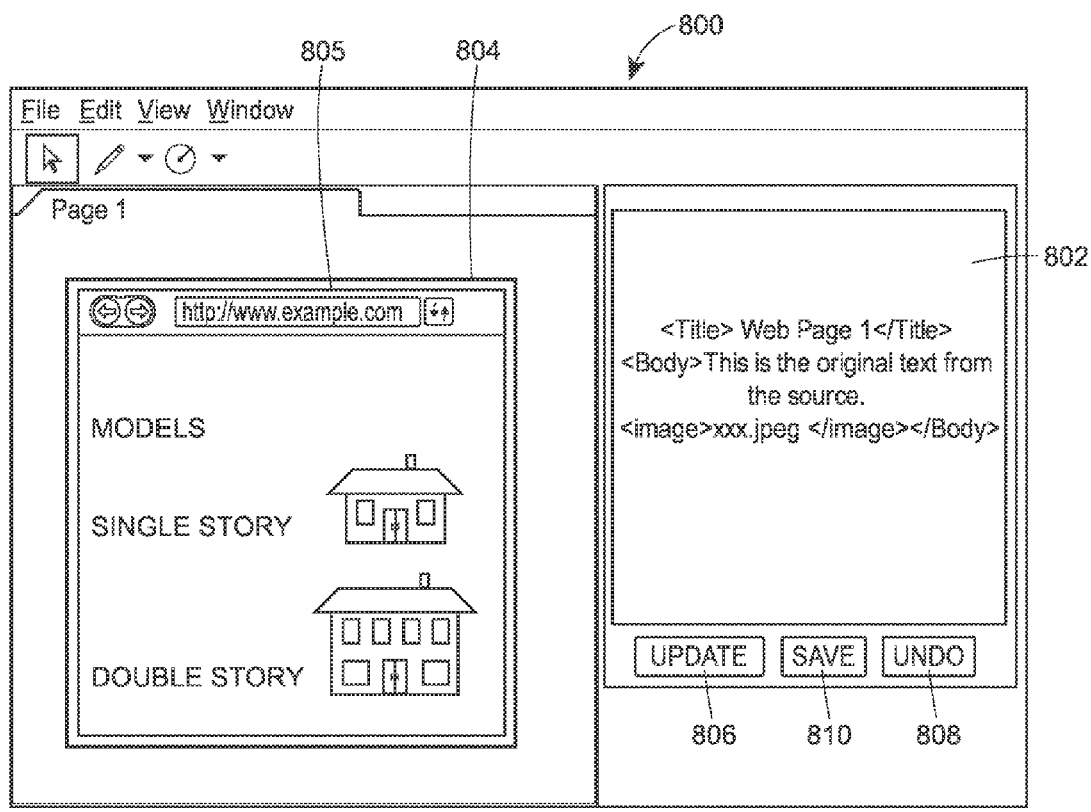
FIG. 8 is an example screenshot of a user interface window which the web application engine of FIG. 3 may generate to allow a user to edit a composite document that includes modeling data and web page data.

FIG. 8 is an example screenshot of a user interface window 800 which the web reference editor 304 of FIG. 3 may generate to allow users to edit web page data. The web reference editor 304 may provide an html editor 802 as an embedded window in which the web page data is displayed. As illustrated in FIG. 8, the displayed web page data includes content (e.g., text) as well instructions in a mark-up language such as HTML. In some scenarios, web page data may include images, Flash content, etc., and the html editor 802 may display appropriate icons to indicate the presence of such content. The html editor 802 may also parse the modified web page data and generate an appropriate notification if the modified web page data does not comply with the HTML language.

As further illustrated in FIG. 8, the web reference editor 304 may interpret and render the web page data in a container 804. For example, the web reference editor 304 may invoke an embedded browser such as the web view library 242 illustrated in FIG. 2. The web reference editor 304 may additionally provide navigation controls in a toolbar 805 to allow a user to actively interact with rendered web page data. In an embodiment, when the user clicks on an update button 806, the web reference editor 304 may generate an image corresponding to the modified web page data and display image in the container 804. However, if the user clicks on the undo button 808, the web reference editor 304 discards changes made to the web page data via the html editor 802. The web reference editor 304 may store the changes to the web page data in the corresponding web reference entity when the users clicks on the save button 810.

Figure 9:
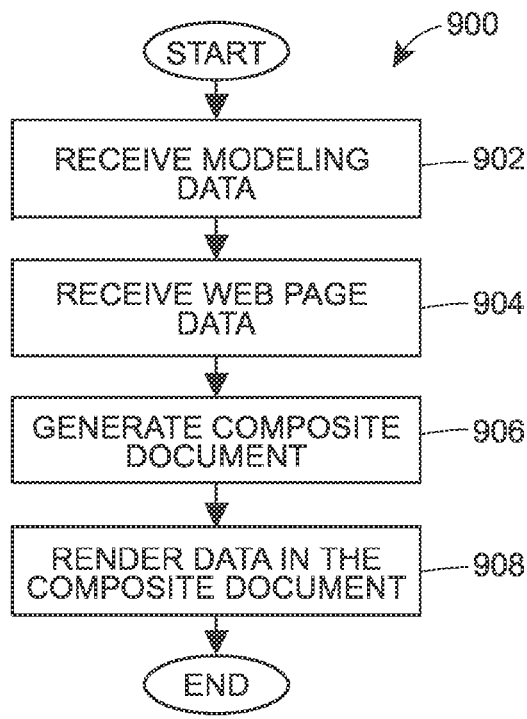
FIG. 9 is a flow diagram of an example method for generating a composite document that includes web page data.

Next, an example method for generating a composite document that includes web page data and at least one other type of data is discussed with reference to FIG. 9. By way of example only, FIG. 9 illustrates a method 900 for generating a composite document that includes web page data and 3D modeling data. However, it is noted that methods similar to the method 900 may be implemented for generating composite documents having other types of data in addition to web page data, e.g., 2D drawing data, text data, image data, map data, etc.

At block 902, 3D model data is received in, for example, a non-image format in which the corresponding 3D model was developed using another software application (such as the 3D modeling software 240 illustrated in FIG. 2). A model entity may be generated that includes, for example, the received model data, an indication of the type of received data, a reference to the source of the 3D model data, etc. Next, at block 904, web page data is received. For example, in an embodiment, an address of a source web page is received from a user interface, and web page data is automatically retrieved from the source web page. A web reference entity may be generated that includes, for example, the received web page data and the address of the source web page. At block 906, a composite document that includes the model data and the web page data received at blocks 902 and 904, respectively, is generated. The composite document accordingly may include a model entity and a web reference entity. In other scenarios, a composite document also may include text entities, image entities, sound entities, etc.

At block 908, the entities included in the composite document are rendered. To this end, in an embodiment, each of the modeling data and the web page data is interpreted according to the format to which the corresponding data conforms. More specifically, in an embodiment, the modeling data conforms to a non-image format of a 3D modeling software, and the modeling data is interpreted at block 908 using an appropriate 3D modeling engine, so as to generate a raster image or a vector-based image. Further, the web page data may be interpreted and rendered at block 908 according to the instructions in the mark-up language such as HTML.

According to an embodiment, the method 900 is implemented in the composite document system 200. For example, the method 900 may be at least partially implemented in the 3D modeling engine 204 and the web application engine 202. Further, to implement the method 900, the web reference tool 302 may be used to facilitate user interaction with respect to web page data.

Figure 10:
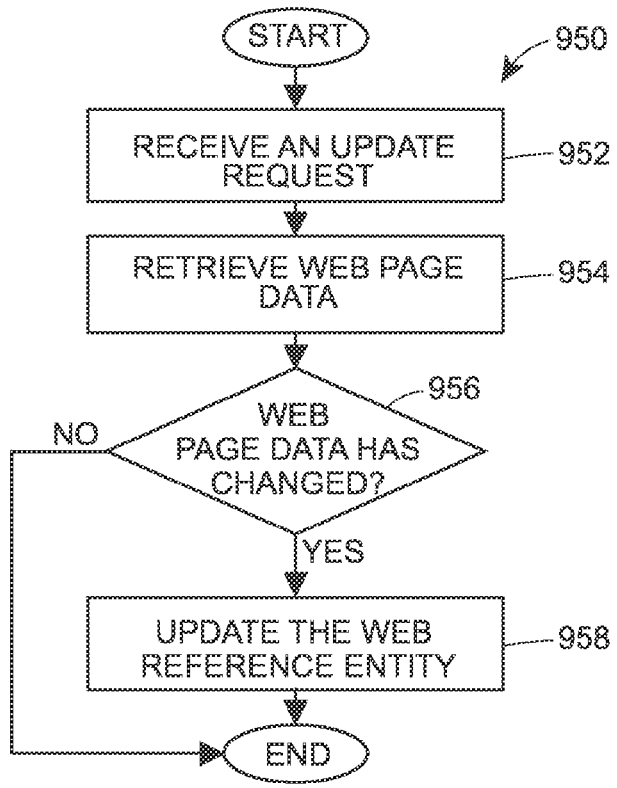
FIG. 10 is a flow diagram of an example method for automatically retrieving updated web page data to be included in a composite document.

FIG. 10 is a flow diagram an example method 950 for automatically retrieving updated web page data for an existing web reference entity. At block 952, a request to update web page is received. Depending on the embodiment, the request is received from a user interface (e.g., from a user interface screen presented by reference inspector tool 306) or automatically in response to a timer expiration, for example. The request may specify the URL that identifies a source web page from which the current version of web page was received. In some scenarios, the URL is stored in the originally generated web reference entity. In other scenarios, the user may specify a new URL (using the web reference selector tool 314, for example).

Next, at block 954, web page data is retrieved in accordance with the request received at block 952. At block 956, the newly retrieved web page data is compared to the web page data already available in the web reference entity to determine whether the web page has changed. In some scenarios, web page data includes an indicator of when the web page was last updated (e.g., day, hour, minute), and the indicator in the newly received web page data is compared to a similar indicator in the previously stored web page data. In another embodiment, the content in the new web page data is compared to the content in the previously stored web page data.

If it is determined that the web page data has been updated, the new version of the web page data is stored in the corresponding web reference entity at block 958. Otherwise, if it is determined that the same web page data has been retrieved at block 954, the flow of the method 950 bypasses block 958, and the method 950 completes.

Satellite and Aerial Image Data Engine

As indicated above, a composite document system may also allow users to generate, edit, and present composite documents that include interactive satellite and aerial image data. According to some embodiments, a satellite data service provides one or both of satellite and aerial image data via a data server (such as the satellite and aerial data server 144 illustrated in FIG. 1) as well as APIs for accessing, rendering, and interacting with such data. Satellite and aerial image data may be provided in a manner that allows rendering of a geographic area in 3D and simulating movement through 3D space. For example, a satellite image of a mountain range may be projected onto, or otherwise combined with, a 3D terrain view of the same area. Further, a satellite data service may provide terrain data as well as geo-relevant static data such as street names and dynamic data such as current weather data, traffic data, and airline flight tracking data. The additional geo-relevant data may be associated with one or several layers to enable selective display of such data over satellite and aerial image data. For simplicity, data that includes one or both of satellite imagery and aerial imagery, as well as additional geo-relevant data, is referred to below as "satellite data." In some embodiments, satellite data may conform to the Keyhole Markup Language (KML) format or, when distributed in a compressed manner, to the KML-zipped (KMZ) format. In other embodiments, satellite data conforms to another non-image format. In an embodiment, the composite document system utilizes the Google Earth API.

Figure 11:
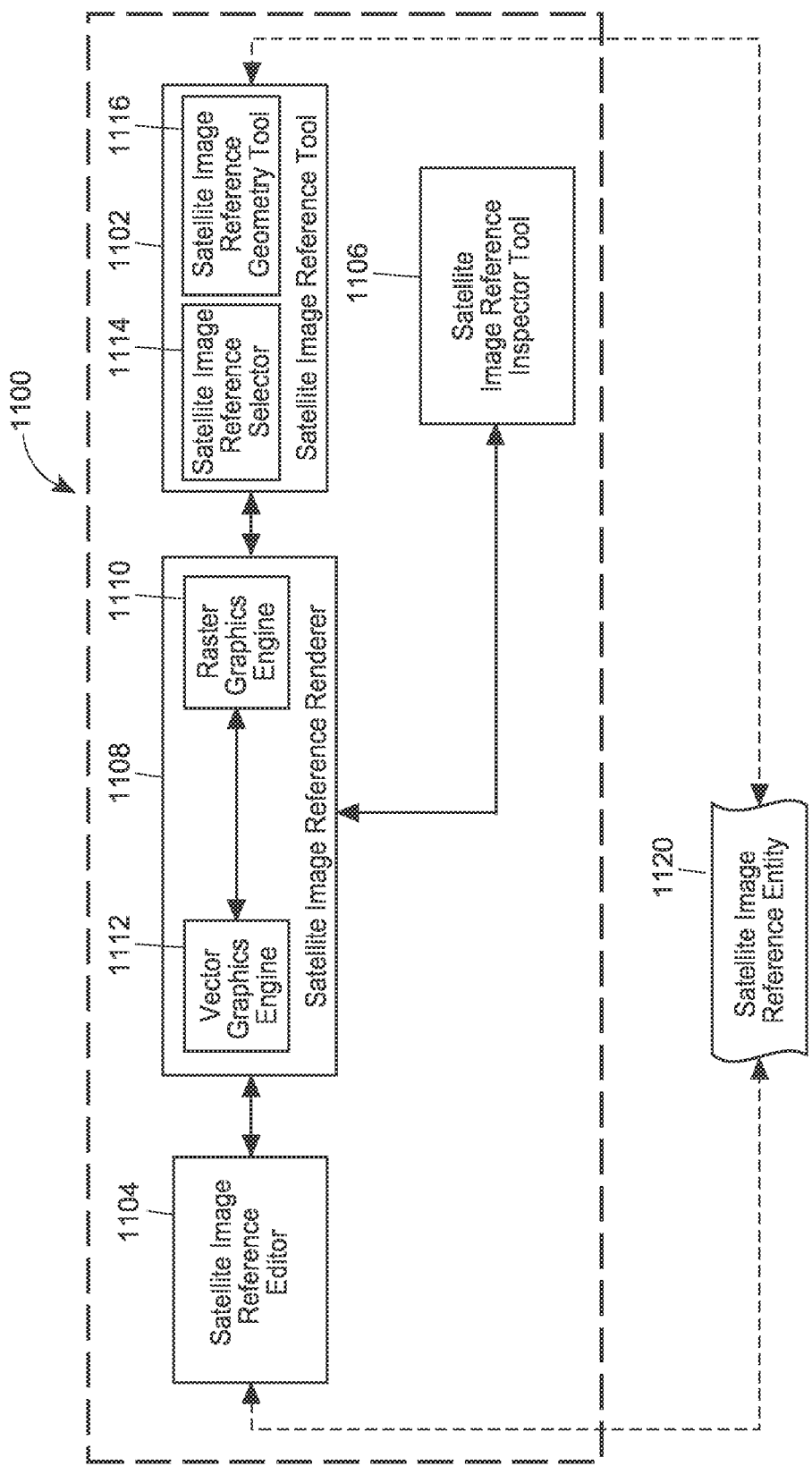
FIG. 11 is a block diagram of an example satellite and aerial data engine that may be used in the composite document system of FIG. 2.

Referring to FIG. 11, an example satellite and aerial data engine 1100 may operate in the composite document system 100 or 200, for example, to support including, editing, and interacting with satellite data in a composite document. The satellite and aerial image engine may 1100 may include a satellite image reference tool 1102, a satellite image reference editor (or tool) 1104, a satellite image reference inspector tool 1106, and a satellite image reference renderer 1108. Further, in the embodiment illustrated in FIG. 11, the reference renderer 1108 includes a raster graphics engine 1110 and a vector graphics engine 1112, and the satellite image reference tool 1102 includes a satellite image reference selector 1114 and a satellite image reference geometry tool 1116. A user may be able to access some of the tools 1102, 1104, and 1106 only in certain modes of operation, according to an embodiment.

The satellite and aerial data engine 1100 may operate on a satellite image reference entity 1120 stored on a computer-readable medium. The satellite image reference entity 1120 may include satellite data and such additional information as, for example, an indication of a geographic location to which the satellite data corresponds (e.g., latitude/longitude coordinates, a postal code, a street address), a timestamp to indicate when the satellite data was last updated, a snapshot of the satellite data in a digital image format (e.g., JPEG, PNG, GIF), etc. Similar to the web reference entity 320 discussed above, the satellite image reference entity 1120 may be included in a composite document that also includes 3D modeling data or 2D drawing data, stored in a corresponding model or drawing entity, and rendered in a corresponding container when the composite document is displayed on a user interface. Further, the composite document may also include text, images in a digital image format, web page data, map data, etc.

In operation, the satellite image reference selector 1114 may receive a reference to a geographic location for which a user wishes to receive satellite data. In an embodiment, the reference includes geographic coordinates such as Global Positioning Service (GPS) coordinates or Universal Transverse Mercator (UTM) coordinates. In other embodiments, the reference includes a street address, a postal code such as the Zone Improvement Plan (ZIP) code used in the United States, or any other suitable indication of a geographic location or region. The satellite image reference selector 1114 may receive a reference to a geographic location from an input device, a file, or the OS clipboard, for example. Upon receiving a reference to a geographic location via the satellite image reference selector 1114, the satellite and aerial data engine 1100 may request corresponding satellite data using an API provided by a satellite data service, for example. In response to receiving the requested satellite data, the satellite and aerial data engine 1100 may generate a new entity (such as the satellite image reference entity 1120) to store the satellite data.

The satellite image reference geometry tool 1116 may provide a set of controls for user to define and locate within a composite document a container that includes a visual representation of satellite data. For example, according to an embodiment, the satellite image reference geometry tool 1116 receives positioning, size, orientation, and other initial geometry data for the container. In those embodiments that include 3D rendering, the initial geometry may also include tilt selection. The initial geometry data may be stored in the corresponding satellite image reference entity.

With continued reference to FIG. 11, the satellite image reference renderer 1108 may render satellite data as a bit map image. In an embodiment, the vector graphics engine 1112 generates a vector-based visual representation of satellite data using APIs provided by the satellite data service or by otherwise interpreting satellite data received from the satellite data service. The raster graphics engine 1110 then converts the output of the vector graphics engine 1112 to a bit map image sized according to the dimensions of the container in which the satellite data is displayed within the composite document, according to an embodiment.

The satellite image reference renderer 1108 may render and re-render satellite data in accordance with user commands received from a user interface or in response to other events (timer expiration, detected changes in source satellite data, etc.). For example, when the satellite image reference tool 1102 receives a command to adjust visual characteristics of satellite data, such as a command to resize the corresponding container, the satellite image reference renderer 1108 may accordingly re-render the satellite data. Further, the satellite image reference renderer 1108 may automatically re-render satellite data upon detecting that a user has updated the selection of layers of geo-relevant data. For example, when current visual representation of satellite data includes weather data, and a user unselects the weather data rendering using the satellite image inspector tool 1106, the satellite image reference renderer 1108 re-renders the satellite data so as to remove weather information. Still further, in an embodiment, the satellite and aerial data engine 1100 automatically requests certain dynamic data, such as current weather data, for example, according to a certain configurable schedule.

The satellite image inspector tool 1106 provides a set of satellite data controls in dockable, modeless window, via which a user selects viewing options for a selected satellite data entity, according to an embodiment. The satellite data controls may include an input box specifying a reference to a geographic location, navigation controls (such as pan, zoom, rotate, tilt, etc.), and layer visibility controls (e.g., respective toggle switches for current weather data, airline flight tracking, etc.). In an embodiment, the satellite image inspector tool 1106 also provides 3D viewing controls such as a tilt tool, for example. In some scenarios, a user utilizes the satellite image inspector tool 1106 when working with the satellite image reference editor 1104.

The satellite image reference editor 1104 may implement a satellite data viewer configured to render satellite data and support user interaction with the satellite data. For example, the image reference editor 1104 may provide a set of controls via a user interface to allow the user to select a location in the visual representation of the satellite data, zoom in and out of the selected location, pan to a new location, rotate the visual representation of the satellite data, etc. In some embodiments, the satellite image reference editor 1104 is available in the edit mode of a composite document but unavailable in the presentation mode, for example. In another embodiment, all functions of the satellite image reference editor 1104 are available in all modes of operation. In yet another embodiment, the satellite image reference editor 1104 is available in all modes of operation with different functions enabled.

In an embodiment, the satellite image reference editor 1104 includes a satellite data viewer that is provided as a plugin component. The plugin component may be configured to interact with one or more applications in the corresponding software environment. For example, some or all of the functionality of the plugin for a satellite data viewer may be accessible to the satellite and aerial data engine 1100 as well as a browser application. As another example, referring back to FIG. 2, the plugin for a satellite data viewer may be installed in the computing environment 201 and configured to be accessible to the web application engine 202 and the satellite and aerial image data engine 203.

Figure 12:
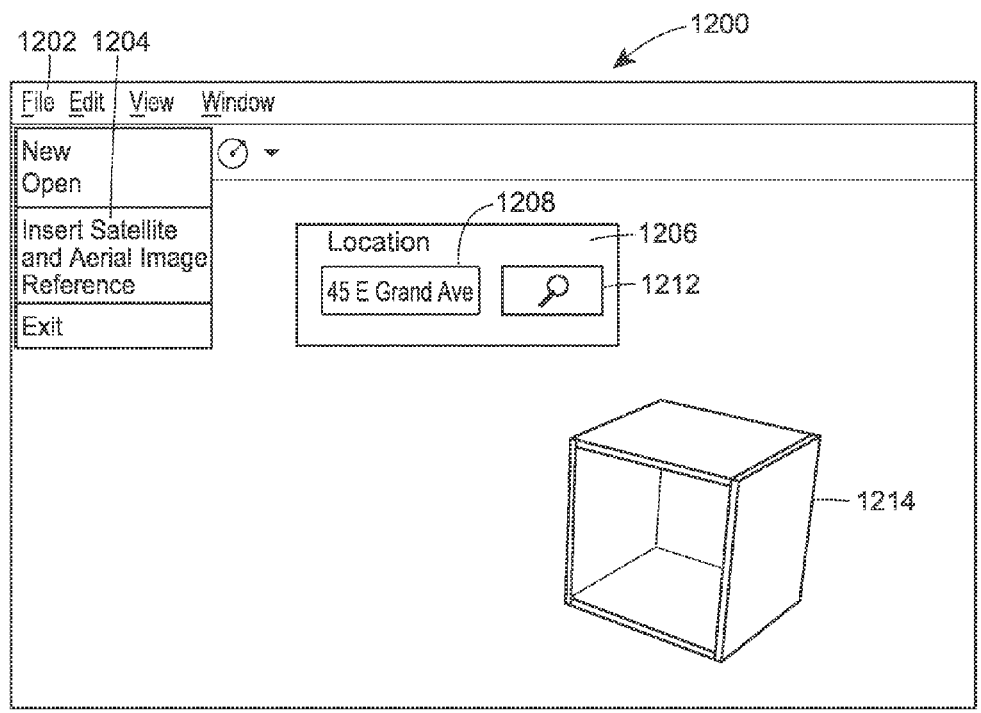
FIG. 12 is an example screenshot of a user interface window which the satellite and aerial data engine of FIG. 11 may generate to receive a reference to satellite and aerial image data.

FIG. 12 is an example screenshot of a user interface window 1200 which the satellite image reference selector 1114 of FIG. 11 may display to receive a reference to a geographic location from a user. In an embodiment, a reference selector tool dialog box 1206 is generated when a user selects the Insert command 1204 from the File menu 1202. The user may specify the reference to a geographic location by supplying in the text box 1208 one or more of the coordinates, the postal code, the street address, etc. of a region for which the user wishes to retrieve satellite data. The user may then click on the button 1212 to initiate the process of retrieving satellite data. The composite document in the example of FIG. 12 also includes a 3D model entity that contains model data, rendered in the user interface window 1200 as a 3D model 1214.

In an embodiment, the satellite image reference selector 1114 displays the dialog box 1206 upon determining that certain text in an OS clipboard potentially includes a reference to a geographic location. The satellite and aerial data engine 1100 may prompt the user to determine whether the identified text should be interpreted as a reference to a geographic location and a satellite image reference entity should be created with satellite data corresponding to the reference. As discussed above with reference to the web reference selector tool 314 of FIG. 3, when a user wishes to transfer text from a text editing software to a document composite, the text editing software may place the text into the OS clipboard, and the composite document system, in response to the user pasting the text from the OS clipboard into a composite document, may automatically generate a text entity that includes the text. However, when the text includes a string of characters that can be interpreted as a street address, an intersection of several streets, a postal code, GPS coordinates or other geographic coordinates, etc., the composite document system may suggest to the user that a satellite image reference entity be generated in addition to, or instead of, the text entity. The composite document system may further suggest to the user that satellite data be retrieved according to the reference to a geographic location detected in the pasted text.

Figure 13:
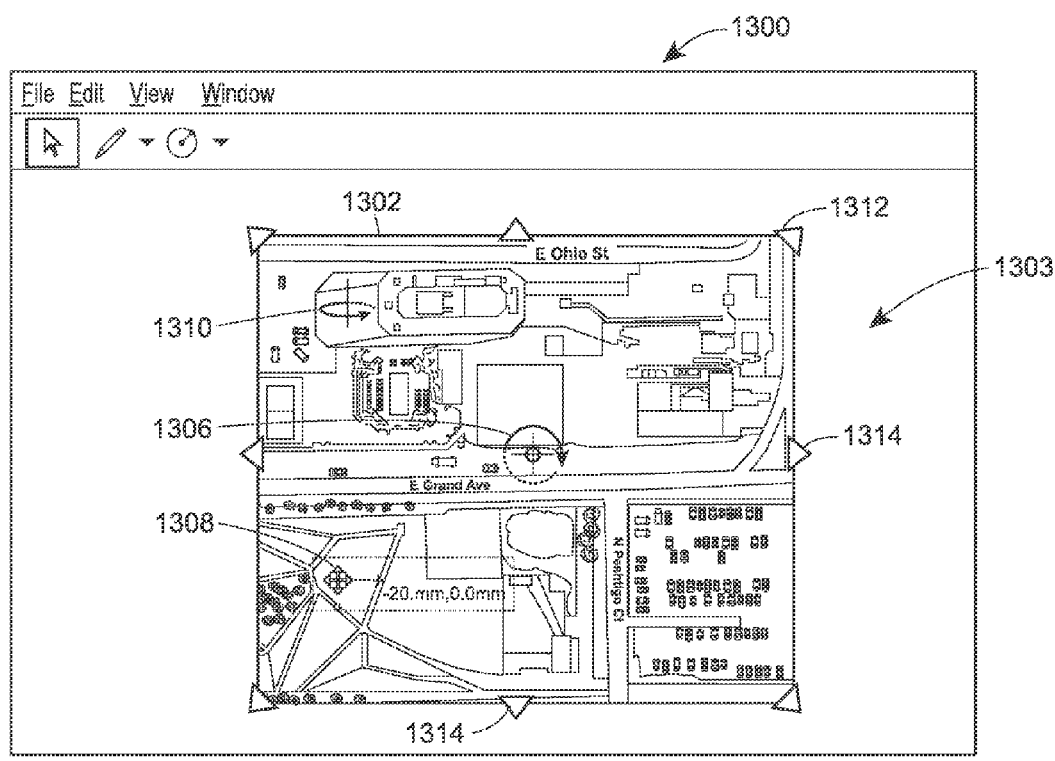
FIG. 13 is an example screenshot of a user interface window which the satellite and aerial data engine of FIG. 11 may generate to receive positioning data for satellite and aerial image data.

FIG. 13 is an example screenshot of a user interface window 1300 which the satellite image reference geometry tool 1116, discussed with reference to FIG. 11, may generate to receive positioning and geometry data from a user and position a container 1302 enclosing satellite data data within a composite document 1303, according to an embodiment. The satellite image reference geometry tool 1116 may provide a set of geometry and positioning controls such as rotate tools 1306 and 1310, a move tool 1308, proportional dimension controls 1312 to set the size of the container 1302, horizontal/vertical dimension controls 1314 to stretch the visual representation of satellite data in the container 1302, etc. In some embodiments, the geometry and positioning controls may also include 3D rendering controls such as a tilt tool (not shown), for example.

Figure 14:
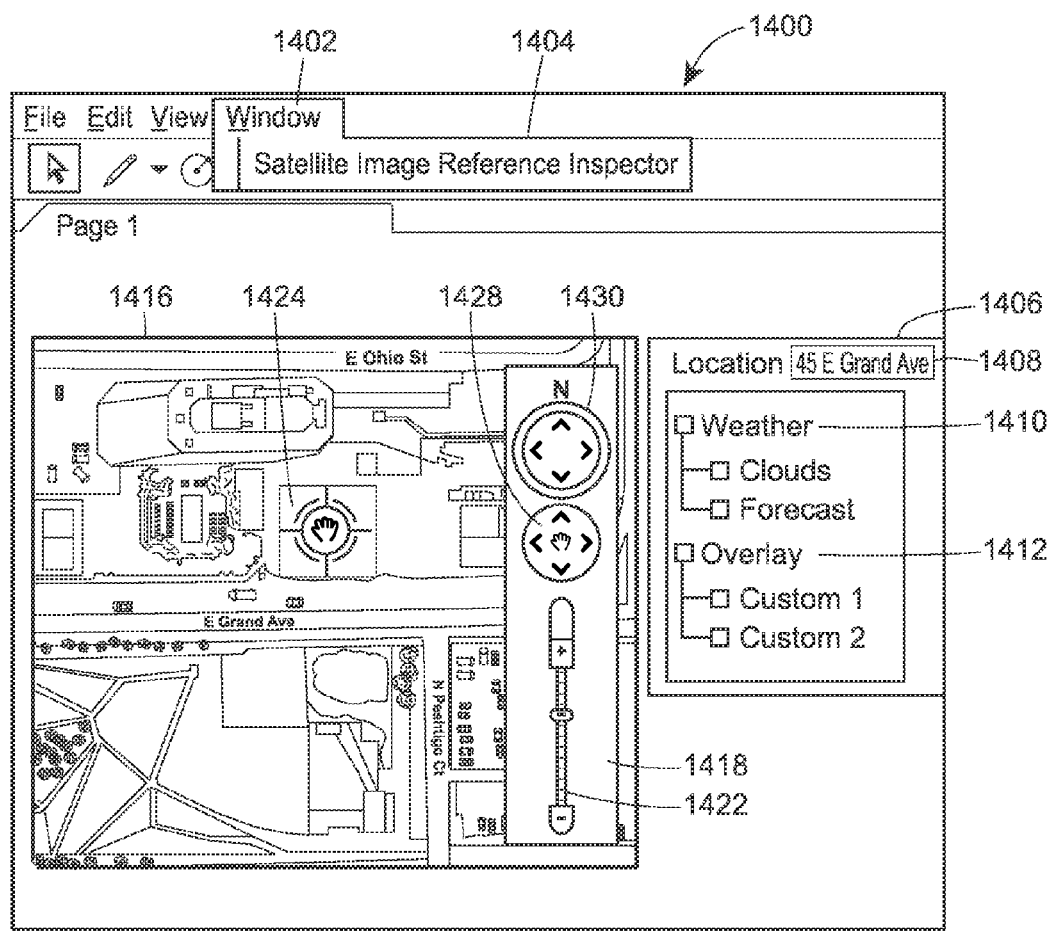
FIG. 14 is an example screenshot of a user interface window which the satellite and aerial data engine of FIG. 11 may generate to configure a composite document that includes satellite and aerial image data.

Referring to FIG. 14, a user may select the Satellite Reference Inspector 1404 item from a menu 1402 provided in a user interface window 1400 and, in response, the satellite and aerial data engine 1100 may generate a dockable, modeless inspector dialog 1406 to provide several controls for interacting with satellite data in a composite document. In the example embodiment illustrated in FIG. 14, the inspector dialog 1406 includes a text box 1408 to receive a street address (or another reference to a geographic location) and a set of checkboxes 1410 to select additional data to be displayed over a visual representation of satellite data. For example, the checkboxes 1410 allow the user to select whether one or several components of weather information (e.g., clouds, forecast) are to be displayed over satellite photographs, and overlay selection options 1412 further allow the user to apply custom overlay selections (e.g., traffic and street labels displayed over a satellite photograph).

In general, the actions a user may perform via the inspector dialog 1406 apply to a currently selected satellite image reference entity. In the example of FIG. 14, satellite data of the currently selected satellite image reference entity is displayed in a container 1416. In an embodiment, the inspector dialog 1406 is accessible in the edit mode of operation but not in the presentation mode.

Further, at least in the edit mode of operation, a user may also activate the satellite image reference editor 1104 that displays an editor toolbar 1418. In an embodiment, the user uses the editor toolbar 1418 to change the zoom level, re-center, adjust the orientation, adjust the tilt, and otherwise interact with the satellite data in the container 1416. To this end, the editor toolbar 1418 may include a zoom selector 1422, a pan control 1424, an orientation control 1428, and a tilt control 1430, for example.

According to an example scenario, when editing a composite document, a user specifies a geographic location using the satellite image reference selector 1114, defines and positions a container within a composite document in which satellite data corresponding to the geographic location is to be displayed using the satellite image reference geometry tool 1116, and selects the desired characteristics for the visual representation of the satellite data and the desires types of data to be included in the visual representation using the editor toolbar 1418 and/or the inspector dialog 1406. The satellite data and the related parameters, such as the geometry of the corresponding container and overlay selections, may be stored in a satellite image reference entity. As discussed above, the composite document may include any number of other entities in addition to the satellite image reference entity. During a presentation, the satellite data may be displayed in one or several presentation slides in accordance with the parameters and options specified in the edit mode. In some embodiments, the user may interact with the satellite data in the presentation mode to zoom in on the location being discussed in the corresponding presentation slide, "fly over" from one location to another, etc. Moreover, depending on the user configuration, information such as airline flight tracking data may be updated in real-time during a presentation. On the other hand, if the composite document system cannot access the satellite data provider, the snapshot included in the satellite image reference entity may be displayed in the corresponding container (such as the container 1416) during a presentation.

Figure 15:
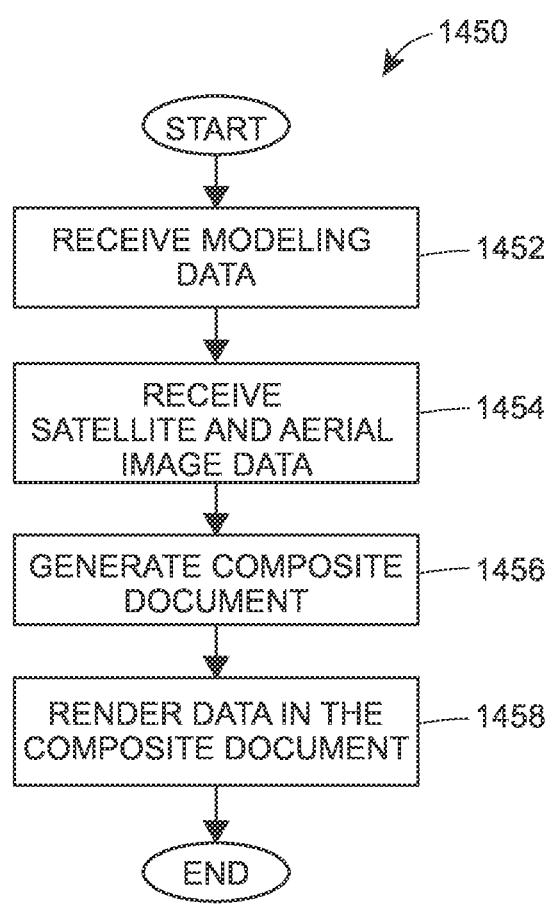
FIG. 15 is a flow diagram of an example method for generating a composite document that includes modeling data and satellite and aerial image data.

Referring to FIG. 15, a method 1450 for generating a composite document that includes satellite data and 3D modeling data may be implemented in the composite document system 200. For example, the method 1450 may be at least partially implemented in the 3D modeling engine 204 and the satellite and aerial image data engine 203. It is noted that generating a composite document that includes satellite data and 3D modeling data is discussed by way of example only, and that in general, methods similar to the method 1450 may be implemented to generate composite documents having other types of data in addition to satellite data, e.g., 2D drawing data, text data, image data, web page data, 2D map data, etc.

At block 1452, 3D model data is received in, for example, a non-image format in which the corresponding 3D model was developed using another software application (such as the 3D modeling software 240 illustrated in FIG. 2), and a model entity is generated that includes the received model data. Next, at block 1454, satellite data is received. For example, in an embodiment, a reference to a geographic location is received from a user interface, and satellite data corresponding to the geographic location is automatically retrieved from a satellite data server (e.g., the satellite and aerial image data server 144 of FIG. 1). A satellite image reference entity may be generated that includes the received satellite data and the reference to the geographic location. At block 1456, a composite document that includes the model data and the satellite data received at blocks 1452 and 1454, respectively, is generated. The composite document accordingly may include a model entity and a satellite image reference entity. In other scenarios, the composite document also may include text entities, image entities, sound entities, etc.

At block 1458, the entities included in the composite document are rendered. To this end, in an embodiment, each of the modeling data and the satellite data is interpreted according to the format to which the respective data conforms. For example, the modeling data that conforms to a non-image format of a 3D modeling software is interpreted at block 1458 so as to generate a raster image or a vector-based image, and the satellite data that conforms to a non-image format of a satellite data service may be interpreted and rendered at block 1458 so as to generate a raster image or a vector-based image.

Map Data Engine

In some cases, a user may wish to include map data in a composite document system. In an embodiment, a map data service provides interactive map data via a data server (such as the map data server 142 illustrated in FIG. 1) as well as APIs for accessing, rendering, and interacting with the map data. The map data may include, for example, topographic data, street and road map data, etc. Further, map data may include additional static or dynamic data that optionally can be displayed over the topographic or street data. For example, additional static map data may include such data as bicycle trails, points of interest such as museums or theaters, business data such as restaurants or shops, etc. On the other hand, additional dynamic data may include current traffic data, weather data, etc. The additional static and dynamic map data may be associated with one or several layers to enable selective display of such data. In some embodiments, the map data service provides map data as a set of tiles in a digital image format. In other embodiments, the map data service provides map data in a non-image format, and the composite document system interprets the map data to generate a visual representation of the corresponding map. In one such embodiment, the map data service provides an appropriate API to generate an image based on map data in a non-image format. In an embodiment, the composite document system utilizes APIs provided by Google Maps or Mapquest.

Figure 16:
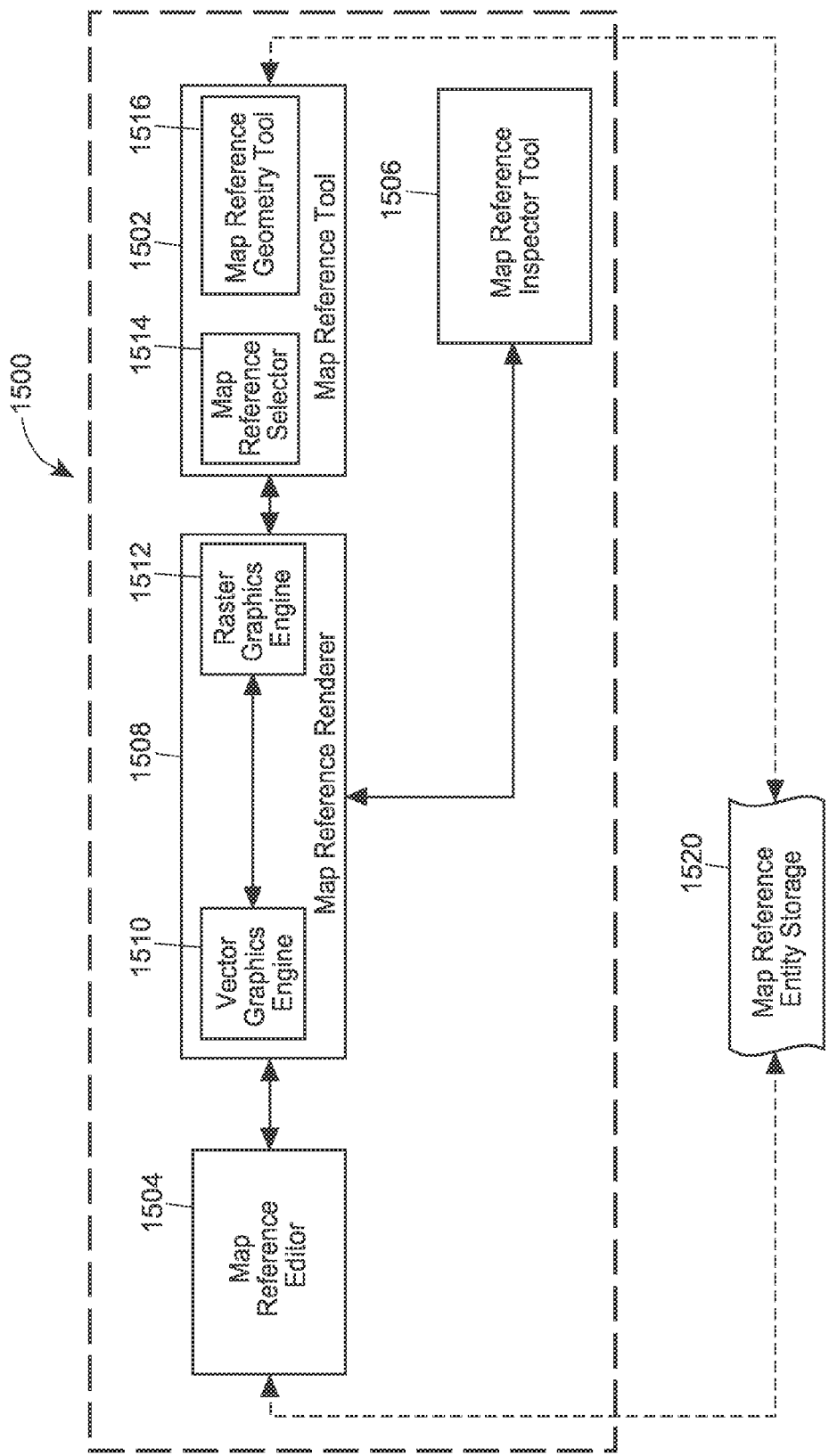
FIG. 16 is a block diagram of an example map data engine that may be used in the composite document system of FIG. 2.

Referring to FIG. 16, an example map data engine 1500 may operate in the composite document system 100 or 200, for example, to support including, editing, and interacting with map data in a composite document. The map data engine may 1500 may include a map reference tool 1502 having a map reference selector 1514 and a map reference geometry tool 1516, a map reference editor 1504, a map reference inspector tool 1506, and a map reference renderer 1508 having a raster graphics engine 1510 and a vector graphics engine 1512. In general, the map data engine 1500 may operate on a map reference entity 1520 stored on a computer-readable medium. The map reference entity 1520 may include map data and such additional information as, for example, an indication of a geographic location to which the map data corresponds (e.g., latitude/longitude coordinates, a postal code, a street address), a timestamp to indicate when the map data was last updated, a snapshot of the map data in a digital image format (e.g., JPEG, PNG, GIF), etc. Similar to the web reference entity 320 and the satellite image reference entity 1120 discussed above, the map reference entity 1520 may be included in a composite document that also includes 3D modeling data or 2D drawing data, stored in a corresponding model or drawing entity, and rendered in a corresponding container when the composite document is displayed on a user interface. Further, the composite document may also include text, images in a digital image format, web page data, satellite data, etc.

In an embodiment, the map reference selector 1514 operates similar to satellite image reference selector 1114 and receives a reference to a geographic location for which a user wishes to receive map data. The reference may include GPS or UTM coordinates, a street address, a ZIP code, etc. The map data engine 1100 may then request corresponding map data using an API provided by a map data service, for example, and, in response to receiving the requested map data, generate a new map reference entity to store the map data.

The map reference geometry tool 1516 may provide a set of controls such that a user can supply positioning, size, orientation, and other geometry data for a container that encloses a visual representation of the map data. The initial geometry data may be stored in the corresponding map reference entity, such as the map reference entity 1520. With continued reference to FIG. 16, the map reference renderer 1508 may render map data as a bit map image, and generally may be similar to the satellite image reference renderer 1108 discussed with reference to FIG. 11. In particular, according to at least some embodiments, the vector graphics engine 1512 generates a vector-based visual representation of map data using APIs provided by the map data service or by otherwise interpreting map data received from the map data service. The raster graphics engine 1512 then converts the output of the vector graphics engine 1510 to a bit map image sized according to the dimensions of the container in which the map data is displayed within the composite document, according to an embodiment.

The map reference renderer 1508 may render and re-render map data in accordance with user commands received from a user interface or in response to other events (timer expiration, detected changes in source satellite data, etc.). For example, when the map reference tool 1502 receives a command to adjust visual characteristics of map data, such as a command to resize the corresponding container, the map reference renderer 1508 may accordingly re-render the map data. Further, the map reference renderer 1508 may automatically re-render map data upon detecting that a user has selected new rendering options. For example, a user may select bicycle trail display to cause map reference renderer 1508 to re-render the map data with bicycle trails displayed over the corresponding map. Further, in an embodiment, the map data engine 1500 periodically requests dynamic data, such as current traffic information, and the map reference renderer 1508 re-renders the map data using the new dynamic data.

The map inspector tool 1506 provides a set of map data controls in dockable, modeless window, via which a user selects viewing options for a selected map data entity, according to an embodiment. The map data controls may include an input box specifying a reference to a geographic location, navigation controls (such as pan, zoom, rotate, etc.), layer visibility controls (e.g., respective toggle switches for current weather data, current traffic data, airline flight tracking, etc.). In some scenarios, a user utilizes the map inspector tool 1506 when working with the map reference editor 1504.

The map reference editor 1504 may implement a satellite data viewer configured to render map data and support user interaction with the map data. For example, the image reference editor 1404 may provide a set of controls via a user interface to allow the user to select a location in the visual representation of the map data, zoom in and out of the selected location, pan to a new location, rotate the visual representation of the map data, etc. In some embodiments, the map reference editor 1504 is available in the edit mode of a composite document but unavailable in the presentation mode, for example. In another embodiment, all functions of the map reference editor 1504 are available in all modes of operation. In yet another embodiment, the map reference editor 1504 is available in all modes of operation with different functions enabled.

In an embodiment, the satellite image reference editor 1504 includes a map viewer that is provided as a plugin component, which may be configured to interact with one or more applications in the corresponding software environment. For example, some or all of the functionality of the plugin for a map viewer may be accessible to the map data engine 1500 as well as a browser application. As another example, referring back to FIG. 2, the plugin for a map viewer may be installed in the computing environment 201 and configured to be accessible to the web application engine 202 and the map data engine 205.

Figure 17:
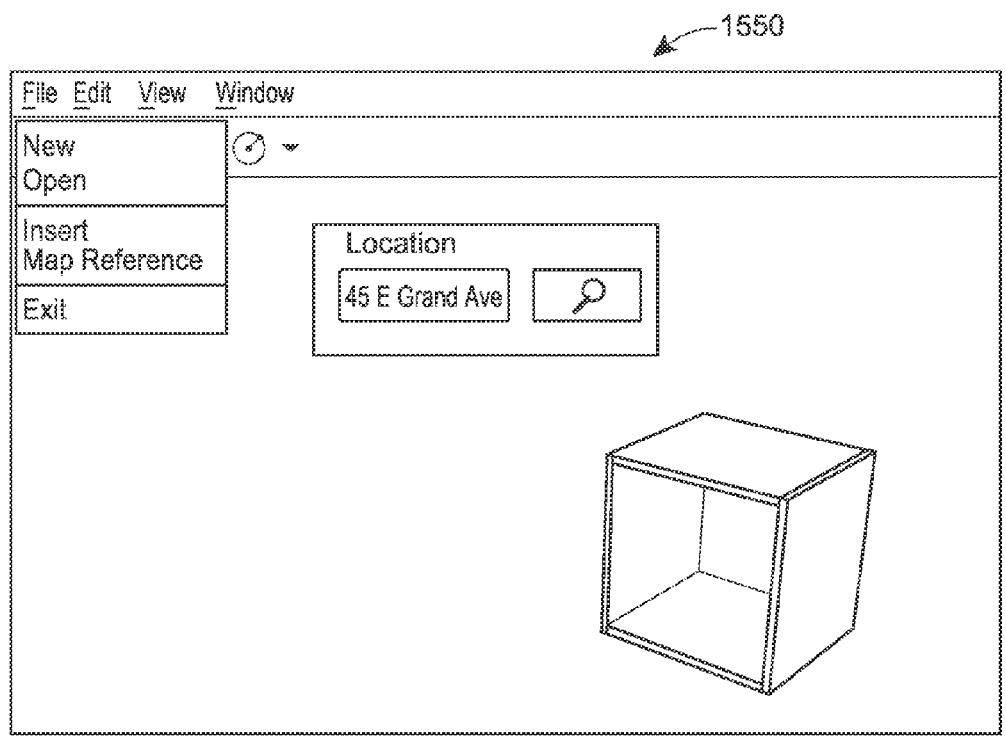
FIG. 17 is an example screenshot of a user interface window which the map data engine of FIG. 16 may generate to receive a reference to map data.

Referring to FIG. 17, the map reference selector 1514 generates a user interface window 1550 similar to the window 1200 illustrated in FIG. 12 to receive a reference to a geographic location from a user. Further, similar to the satellite image reference selector 1114, upon determining that certain text in an OS clipboard potentially includes a reference to a geographic location, the map reference selector 1514 may prompt the user to determine whether a map reference entity should be generated corresponding to the detected reference. In an embodiment, upon detecting a potential reference to a geographic location, the composite document system allows the user to select between processing the detected potential reference as text, a reference to a map, a reference to a satellite and aerial image, or a reference to both a map and satellite and aerial image.

Figure 18:
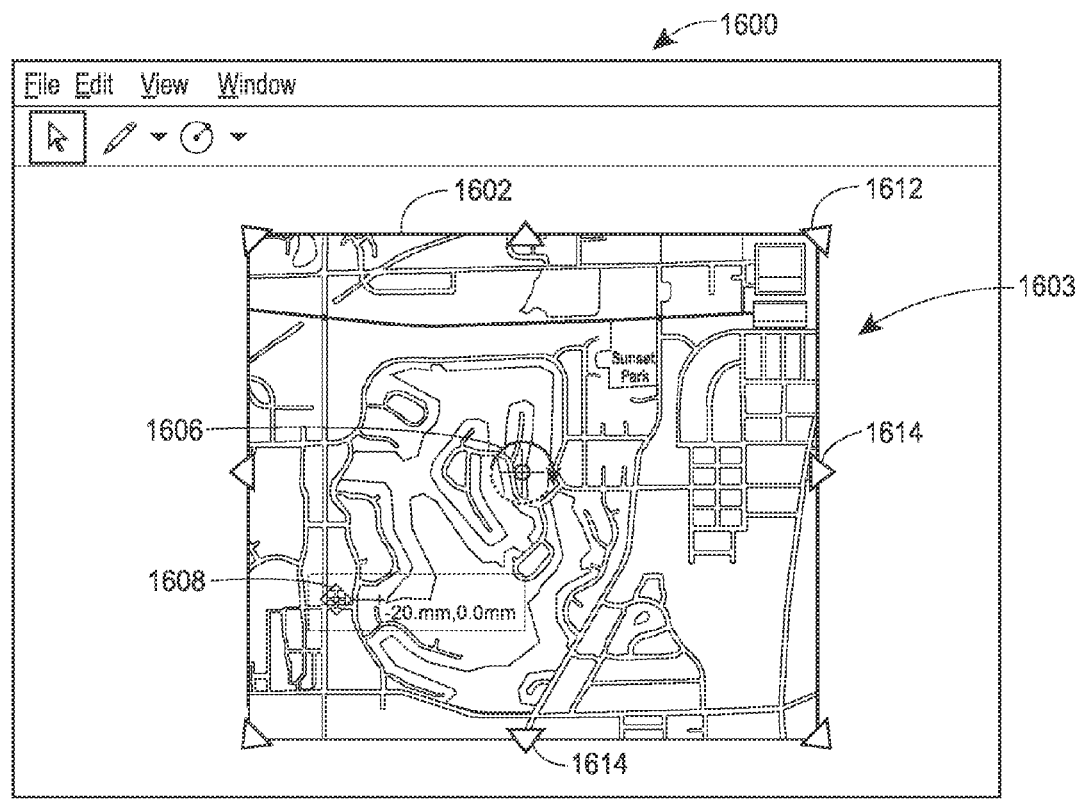
FIG. 18 is an example screenshot of a user interface window which the map data engine of FIG. 16 may generate to receive positioning data for map data.

Referring to FIG. 18, the map reference geometry tool 1516 may generate a user interface window 1600 to receive positioning and geometry data from a user and position a container 1602 enclosing map data within a composite document 1603, according to an embodiment. The map reference geometry tool 1516 may provide a set of geometry and positioning controls such as a rotate tool 1606, a move tool 1608, proportional dimension controls 1612 to set the size of the container 1602, horizontal/vertical dimension controls 1614 to stretch the visual representation of satellite data in the container 1602, etc.

Figure 19:
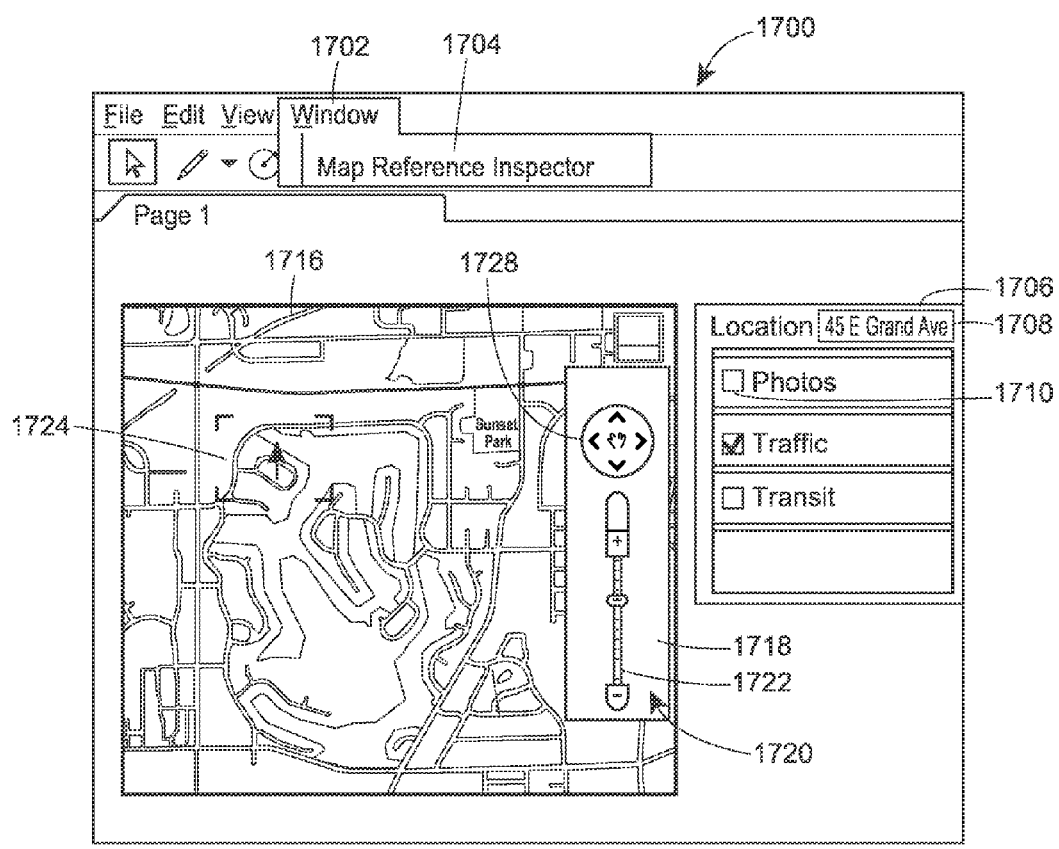
FIG. 19 is an example screenshot of a user interface window which the map data engine of FIG. 16 may generate to allow a user to edit a composite document that includes map data.

Now referring to FIG. 19, a user may select the Map Reference Inspector 1704 item from a menu 1702 provided in a user interface window 1700 and, in response, the map data engine 1500 may generate a dockable, modeless inspector dialog 1706 to provide several controls for interacting with map data in a composite document. In the example embodiment illustrated in FIG. 19, the inspector dialog 1706 includes a text box 1708 to receive a street address (or another reference to a geographic location) and a set of checkboxes 1710 to select additional data to be displayed over a visual representation of map data. For example, the checkboxes 1710 allow the user to select for display one or more types of static information such as photographs and transit information and dynamic information such as traffic.

In general, the actions a user may perform via the inspector dialog 1706 apply to a currently selected map entity. In the example of FIG. 19, map data of the currently selected map reference entity is displayed in a container 1716. In an embodiment, the inspector dialog 1706 is accessible in the edit mode of operation but not in the presentation mode.

Further, at least in the edit mode of operation, a user may also activate the map reference editor 1504 that displays an editor toolbar 1718. In an embodiment, the user uses the editor toolbar 1718 to change the zoom level, re-center, adjust the orientation, and otherwise interact with the map data in the container 1716. To this end, the editor toolbar 1718 may include a zoom selector 1722, a pan control 1724, and an orientation control 1728.

According to an example scenario, when editing a composite document, a user specifies a geographic location using the map reference selector 1514, defines and positions a container within a composite document in which map data corresponding to the geographic location is to be displayed using the map reference geometry tool 1516, and selects the desired characteristics for the visual representation of the satellite data and the desires types of data to be included in the visual representation using the editor toolbar 1718 and/or the inspector dialog 1706. The map data and the related parameters, such as the geometry of the corresponding container and overlay selections, may be stored in a map reference entity. As discussed above, the composite document may include any number of other entities in addition to the map reference entity. During a presentation, the map data may be displayed in one or several presentation slides in accordance with the parameters and options specified in the edit mode. In some embodiments, the user may interact with the map data in the presentation mode to zoom in on the location being discussed in the corresponding presentation slide, pan from one location to another, etc. Moreover, depending on the user configuration, information such as traffic data may be updated in real-time during a presentation. On the other hand, if the composite document system cannot access the map data provider in the presentation mode, the snapshot included in the map image reference entity may be displayed in the corresponding container (such as the container 1716).

Figure 20:
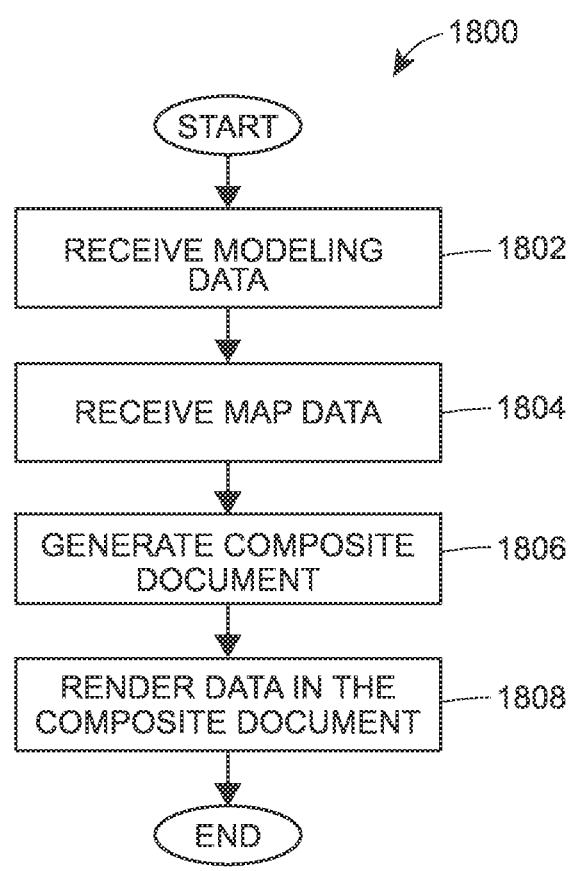
FIG. 20 is a flow diagram of an example method for generating a composite document that includes modeling data and map data.

Referring to FIG. 20, a method 1800 for generating a composite document that includes map data and 3D modeling data may be implemented in the composite document system 200. For example, the method 1800 may be at least partially implemented in the 3D modeling engine 204 and the map data engine 205. It is noted that generating a composite document that includes map data and 3D modeling data is discussed by way of example only, and that in general, methods similar to the method 1800 may be implemented to generate composite documents having other types of data in addition to map data, e.g., 2D drawing data, text data, image data, web page data, satellite and aerial image data, etc.

At block 1802, 3D model data is received in, for example, a non-image format in which the corresponding 3D model was developed using another software application (such as the 3D modeling software 240 illustrated in FIG. 2), and a model entity is generated that includes the received model data. Next, at block 1804, map data is received. For example, in an embodiment, a reference to a geographic location is received from a user interface, and map data corresponding to the geographic location is automatically retrieved from a map data server (e.g., the map data server 142 of FIG. 1). A map reference entity may be generated that includes, for example, the received map data and the reference to the geographic location. At block 1806, a composite document that includes the model data and the map data received at blocks 1802 and 1804, respectively, is generated. The composite document accordingly may include a model entity and a map reference entity. In other scenarios, the composite document also may include text entities, image entities, sound entities, etc.

At block 1808, the entities included in the composite document are rendered. To this end, in an embodiment, each of the modeling data and the map data is interpreted according to the format to which the respective data conforms. For example, the modeling data that conforms to a non-image format of a 3D modeling software is interpreted at block 1808 so as to generate a raster image or a vector-based image, and the map data that conforms to a non-image format of a map data service may be interpreted and rendered at block 1808 so as to generate a raster image or a vector-based image.

Processing Clipboard Data

Figure 21:
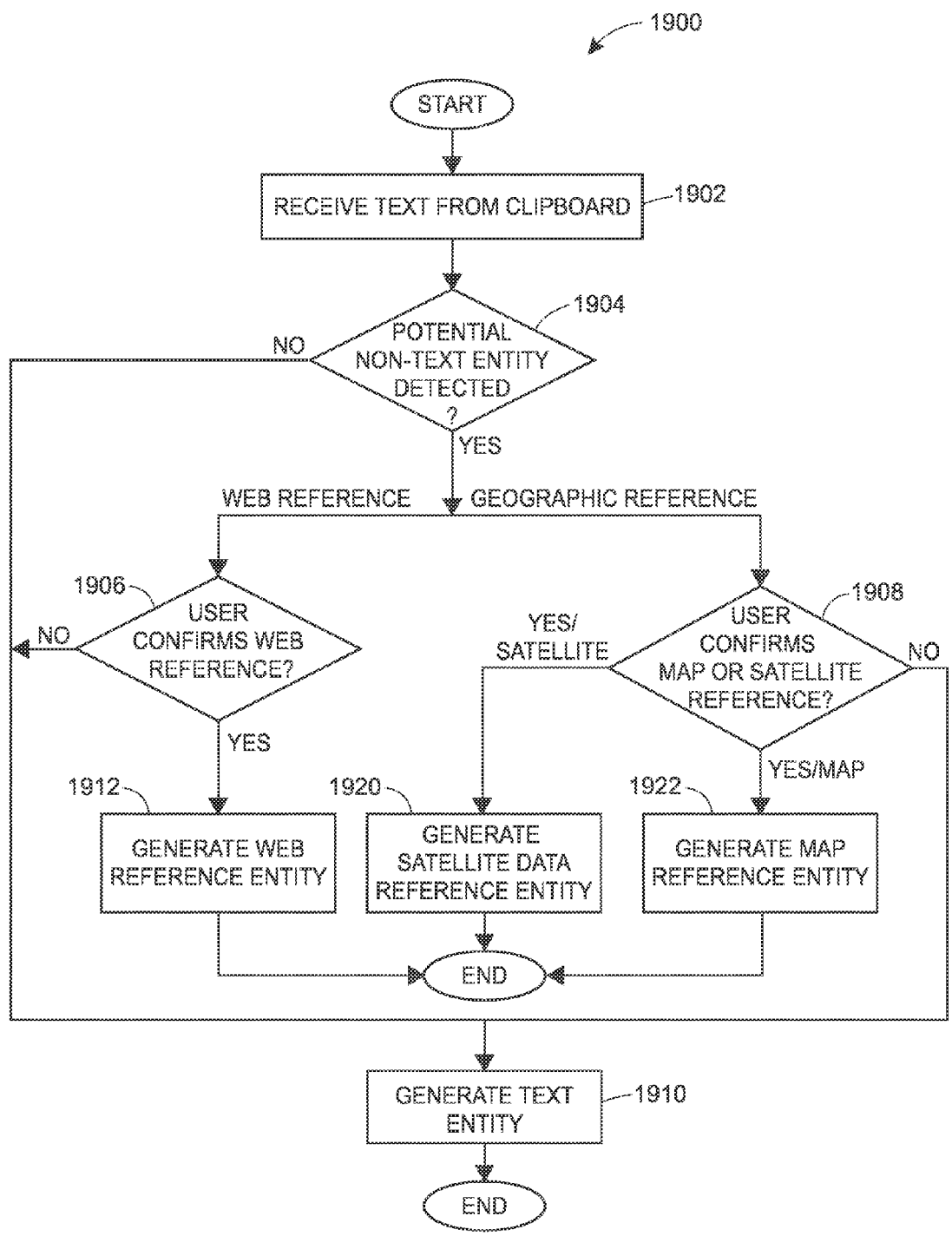
FIG. 21 is a flow diagram of an example method for processing potential references to non-text based entities for use in a composite document.

As discussed above with reference to each of the web application engine 300, the satellite and aerial data engine 1100, and the map data engine 1500, text in the OS clipboard in some cases includes strings that can be parsed as URLs, geographic references such as street addresses, coordinates, or zip codes, etc. By way of further example, FIG. 21 illustrates a method 1900 for automatically detecting and processing potential non-text based entities for use in a composite document. In an embodiment, the method 1900 is implemented in the composite document system 200. In general, the method 1900 may be applied to any memory buffer that includes text, including an OS clipboard.

At block 1902, text is received from the clipboard of an operating system in which the corresponding composite document engine executes. For example, a user may copy a block of text from a text editing application, a browser application, a mailer application, a chat application, etc., and paste the copied text into a composite document. The text also may be parsed at block 1902. If it is determined at block 1904 that the text includes a potential reference to a non-text entity, the flow proceeds to block 1906 if the potential reference is a web reference or to block 1908 if the potential reference is a geographic reference. Otherwise, if the text does not include any potential references to non-text entities, the flow proceeds to block 1910, where a text entity is generated to store the text pasted into the composite document from the OS clipboard.

At block 1906, the user is asked to confirm that the detected potential reference to a web page should be processed as a web reference. For example, the detected potential reference to a web page may be a string that begins with "http://" or "https://." If the user confirms that the string should be processed as a web reference, a web reference entity is created at block 1912. The web reference entity may include the detected web reference and web page data provided by a source web page which the web reference identifies. Thus, according to an embodiment, web page data is automatically retrieved when the user confirms that the string should be processed as a web reference. On the other hand, if the user does not confirm that the string should be processed as a web reference, the flow proceeds to block 1910.

At block 1908, the user is asked to confirm that the detected potential reference to a geographic location should be processed as a geographic reference. For example, the detected potential reference to a geographic location may be a string that potentially includes a street address, a pair of coordinates, etc. If the user confirms that the string should be processed as a geographic reference, the user may be further prompted to select between satellite data and map data. If the user selects satellite data, a satellite image reference entity is generated at block 1920. In some embodiments, the user may be allowed to select both options. If the user selects map data, a map reference entity is generated at block 1922. In an embodiment, satellite data and/or map data are retrieved according to the user selection and included in the corresponding entity. If the user does not confirm that the string should be processed as a geographic reference, the flow proceeds to block 1910, and the string is processed as the text entity (or a portion of a text entity).

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter discussed in this disclosure.

Certain embodiments are described in this disclosure as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described in this disclosure.

Unless specifically stated otherwise, discussions in this disclosure that use words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in this disclosure, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used in this disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments discussed in this disclosure. This is done merely for convenience and to give a general sense of the invention. This description should be read to include one or at least one and the singular also includes the plural unless it is apparent that it is meant otherwise.

Upon reading this disclosure, those of ordinary skill in the art will appreciate still additional alternative structural and functional designs for a system and a process for generating composite documents through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed in this document without departing from the spirit and scope defined in the appended claims.

What is claimed is:

1. A method in a computing device for generating a composite document including a plurality of presentation slides, the method comprising:

receiving drawing data from a user interface, wherein the drawing data includes a plurality of two-dimensional shapes;

generating a first composite document entity, wherein the first composite document entity is a data structure that includes the received drawing data;

receiving, while in an edit mode, a reference to a geographic location from the user interface;

in response to receiving the reference to the geographic location, retrieving photograph data corresponding to the received reference to the geographic location, wherein the photograph data includes at least one of satellite image data and aerial image data for the geographic location;

receiving document geometry data, wherein the document geometry data includes an indication of a position of a first container in the composite document and an indication of one or more dimensions of the first container;

generating a second composite document entity different from the first composite document entity, wherein the second composite document entity is a data structure that includes the photograph data, the reference to the geographic location, and the geometry data that includes the indication of the position of the first container in the composite document and the indication of the one or more dimensions of the first container;

converting the retrieved photograph data from a first format to a second format, wherein the second format is sized according to the one or more dimensions of the first container;

generating a visual representation of the second composite document entity, wherein the visual representation of the second composite document entity includes the photograph data in the second format;

generating the composite document, wherein the composite document includes the first composite document entity and the second composite document entity in one or more slides of the plurality of presentation slides;

displaying the composite document, wherein the visual representation of the second composite document entity is displayed in the first container and the drawing data in the first composite document entity is displayed in a second container, wherein the first container in the composite document is positioned in accordance with the received document geometry data;

receiving dynamic data;

updating the dynamic data in the second composite document entity in real-time, while in a presentation mode; and displaying the updated dynamic data in the one or more slides of the plurality of presentation slides.

2. The method of claim 1, wherein retrieving the photograph data includes:
causing a request for the photograph data to be transmitted to a data service via a network communication link; and
receiving the photograph data from the data service.

3. The method of claim 1, wherein receiving the reference to the geographic location includes receiving at least one of geographic coordinates, a postal code, and a street address.

4. The method of claim 1, further comprising generating an interactive three-dimensional rendering of the photograph data, including tilting the rendering of the photograph data in response to a command from the user interface.

5. The method of claim 1, further comprising receiving map data that conforms to a non-image format, wherein the second composite document entity further includes the map data.

6. The method of claim 5, wherein the map data includes street map data.

7. The method of claim 5, further comprising generating a visual representation of the second composite document entity, including interpreting the map data to render the map data over the photograph data.

8. The method of claim 1, wherein the dynamic data includes at least one of weather data, traffic data, and flight tracking data.

9. The method of claim 1, wherein the document geometry data further includes an orientation of the first container.

10. The method of claim 1, further comprising:
providing a set of interactive controls via the user interface; and
adjusting the visual representation of the second composite document entity in accordance with a user action, wherein a user utilizes the set of interactive controls to perform at least one of: adjust a zoom level to which the photograph data corresponds, rotate the photograph data, re-center the photograph data within the first container, and tilt the photograph data.

11. The method of claim 1, further comprising:
receiving model data that describes a three-dimensional model of an object, wherein the three-dimensional model is generated using a modeling software, and wherein the model data conforms to a non-image format of the modeling software;
generating a third document entity, wherein the third document entity is a data structure that includes the model data; and
interpreting the model data to generate a visual representation of the three-dimensional model, wherein the visual representation is displayed within the composite document.

12. The method of claim 1, wherein receiving the reference to the geographic location includes:
receiving clipboard data from a clipboard of an operating system;
parsing the clipboard data to determine whether the clipboard data contains text interpretable as geographic reference data, wherein the geographic reference data is one of a set of geographic coordinates, a street address, and a postal code; and
if it is determined that the clipboard data contains the text interpretable as geographic reference data, causing a dialogue to be displayed on the user interface to confirm whether the text is to be interpreted as the reference to the geographic location.

13. A tangible non-transitory computer-readable medium storing instructions thereon to implement a composite document system, wherein the instructions, when executed on a processor, cause the processor to:
receive model data that describes a three-dimensional model of an object, wherein the model data conforms to a non-image format;
generate a first composite document entity that includes the model data;
receive clipboard data from a clipboard of an operating system;
parse the clipboard data to determine whether the clipboard data contains text interpretable as geographic reference data, wherein the geographic reference data is at least one of a geographic coordinate, a street address, and a postal code;
if it is determined that the clipboard data contains the text interpretable as geographic reference data, cause a dialogue to be displayed on a user interface to confirm whether the text is to be interpreted as a reference to a geographic location;

receive photograph data that corresponds to the reference to the geographic location, wherein the photograph data includes at least one of satellite image data and aerial image data of the geographic location;

generate a second composite document entity that includes the photograph data and the reference to the geographic location;

generate a composite document including a plurality of presentation slides, the composite document further including the first composite document entity and the second composite document entity in one or more slides of the plurality of presentation slides;

interpret the model data to generate a visual representation of the three-dimensional model;

generate a visual representation of the second composite document entity;

display the composite document, wherein the visual representation of the three-dimensional model data in the first composite document entity is displayed in a first container and the visual representation of the second composite document entity is displayed in a second container;

receive dynamic data;

update the dynamic data in the second composite document entity in real-time, while in a presentation mode; and display the updated dynamic data in the one or more slides of the plurality of presentation slides.

14. The computer-readable medium of claim 13, wherein the instructions further cause the processor to provide a set of drawing controls via the user interface, wherein a user utilizes the set of drawing controls to draw two-dimensional shapes in the composite document.

15. The computer-readable medium of claim 13, wherein the instructions further cause the processor to:

position the second container in the composite document according to document geometry data located in the second composite document entity;

receive updated document geometry data from the user interface, wherein the updated document geometry includes an indication of an updated position of the second container in the composite document; and position the second container in the composite document in accordance with the received updated document geometry data.

16. The computer-readable medium of claim 13, wherein the instructions further cause the processor to:

provide a set of interactive controls via the user interface; and adjust the photograph data in accordance with a user action, wherein a user utilizes the set of interactive controls to perform at least one of: adjust a zoom level to which the photograph data corresponds, rotate the photograph data, adjust a geometric center of the photograph data, and tilt the photograph data.

17. The computer-readable medium of claim 13, wherein the instructions further cause the processor to convert the received photograph data from a first format to a second format, wherein the second format is sized according to one or more dimensions of the second container.

18. A tangible non-transitory computer-readable medium storing instructions thereon to implement a composite document system, wherein the instructions, when executed on a processor, cause the processor to:

receive model data that describes an interactive visual representation of a three-dimensional model of an object according to a non-image format;

generate a first composite document entity, wherein the first composite document entity is a data structure that includes the model data;

generate an interactive visual representation of the first composite document entity including the three-dimensional model to be displayed on a user interface in a first container, wherein the interactive visual representation of the three-dimensional model is rotated in response to a command received via the user interface;

receive a reference to a geographic location;

receive photograph data that corresponds to the received reference to the geographic location, wherein the photograph data includes at least one of satellite image data and aerial image data of the geographic location;

receive geometry data that indicates a position of a second container in a composite document;

convert the received photograph data from a first format to a second format, wherein the second format is sized according to one or more dimensions of the second container;

generate a second composite document entity that is different from the first composite document entity, wherein the second composite document entity includes the photograph data, the reference to the geographic location, and the geometry data indicating the position of the second container in the composite document;

generate an interactive visual representation of the second composite document entity including the photograph data to be displayed on a user interface in the second container, wherein a zoom level to which the photograph data corresponds is adjusted in response to a command received via the user interface;

generate a composite document that includes the first container and the second container;

cause the composite document to be displayed on the user interface as a set of presentation slides, wherein the set of presentation slides includes the interactive visual representation of the three-dimensional model displayed in the first container and an interactive visual representation of the photograph data displayed in the second container;

re-generate the interactive visual representation of the first composite document entity including the three-dimensional model in the first container while the interactive visual representation of the second composite document entity including the photograph data is displayed in the second container;

update dynamic data in the second composite document entity in real-time;

re-generate the interactive visual representation of the second composite document entity including the photograph data and the dynamic data in the second container while the interactive visual representation of the first composite document entity including the three-dimensional model is displayed in the first container.

19. The computer-readable medium of claim 18, wherein the dynamic data includes at least one of weather data, traffic data, and flight tracking data.

* * * * *